US006751662B1

(12) United States Patent
Natarajan et al.

(10) Patent No.: US 6,751,662 B1
(45) Date of Patent: Jun. 15, 2004

(54) POLICY ENGINE WHICH SUPPORTS APPLICATION SPECIFIC PLUG-INS FOR ENFORCING POLICIES IN A FEEDBACK-BASED, ADAPTIVE DATA NETWORK

(75) Inventors: Shankar Natarajan, Fremont, CA (US); Andrew G. Harvey, Pleasanton, CA (US); Hsuan-Chung Lee, Cupertino, CA (US); Vipin Rawat, Sunnyvale, CA (US); Leo Pereira, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/231,780

(22) Filed: Aug. 28, 2002

Related U.S. Application Data

(62) Division of application No. 09/342,337, filed on Jun. 29, 1999, now Pat. No. 6,505,244.

(51) Int. Cl.$^7$ ............................................... G06F 13/00
(52) U.S. Cl. ........................ 709/223; 709/224; 370/251
(58) Field of Search .................................. 709/200, 201, 709/220, 223, 224, 221, 222, 226, 225, 232, 235, 236, 238, 250; 370/251, 352

(56) References Cited

U.S. PATENT DOCUMENTS

| | | | |
|---|---|---|---|
| 4,817,080 A | 2/1984 | Soha ........................... | 370/17 |
| 5,251,152 A | 1/1991 | Notess ........................ | 364/550 |
| 5,258,979 A | 3/1991 | Oomuro et al. ............. | 370/95.1 |
| 5,450,601 A | 12/1992 | Okuda ........................ | 395/800 |
| 5,504,744 A | 6/1994 | Adams et al. .............. | 370/60.1 |
| 5,446,733 A | 8/1995 | Tsuruoka .................... | 370/60.1 |
| 5,742,588 A | 9/1995 | Thornberg et al. .......... | 370/236 |

(List continued on next page.)

OTHER PUBLICATIONS

Arlein, Robert, et al. "LTAP Trigger Gateway for LDAP Directories," Bell Labs Research Document, Mar. 17, 1999.

*Primary Examiner*—Moustafa M. Meky
(74) *Attorney, Agent, or Firm*—Beyer, Weaver & Thomas, LLP.

(57) ABSTRACT

A feedback-based adaptive network is described wherein at least a portion of the network elements report operating information relating to network conditions to a centralized data store. The information which is reported to the data store is analyzed by a policy engine which includes a plurality of application specific plug-in policies for analyzing selected information from the data store and for computing updated control information based upon the analysis of the information. The updated control information is fed back to selected network elements to thereby affect operation of the selected elements. Typically, when the operation of a network element has been affected, its corresponding operating information will change. The new or changed network element operating information is then reported to the data store and analyzed by the policy engine. The policy engine may then generate new or updated control information for affecting the operation of selected elements in the network. In this way, the dynamic and automatic feedback control of network elements is provided in order to allow the network to adapt to changing conditions. Events relating to changing conditions in the network may be reported to selected elements in the network using an event notification service. Additionally the adaptive, feedback-based network of the present invention may include a network quality monitoring system for evaluating performance characteristics or other aspects of the network based upon predetermined standards or criteria. If it is determined that a particular characteristic of the network does not conform with the standards established for that characteristic, the policy which controls that particular characteristic of the network may be automatically and dynamically modified to thereby affect the network performance.

44 Claims, 20 Drawing Sheets

U.S. PATENT DOCUMENTS

| | | | |
|---|---|---|---|
| 5,542,047 A * | 7/1996 | Armstrong | 709/211 |
| 5,781,703 A | 9/1996 | Desai et al. | 395/54 |
| 6,137,777 A | 2/1997 | Vaid et al. | 370/230 |
| 5,654,958 A * | 8/1997 | Natarajan | 370/410 |
| 5,734,654 A | 3/1998 | Shirai et al. | 370/396 |
| 5,734,697 A | 3/1998 | Jabbarnezhad | 379/32 |
| 5,761,502 A | 6/1998 | Jacobs | 395/514 |
| 5,774,667 A | 6/1998 | Garvey et al. | 709/252 |
| 6,108,304 A | 6/1998 | Abe et al. | 370/232 |
| 5,813,016 A * | 9/1998 | Sumimoto | 707/201 |
| 5,842,040 A | 11/1998 | Hughes et al. | 395/831 |
| 5,870,561 A | 2/1999 | Jarvis et al. | 709/200 |
| 5,872,931 A | 2/1999 | Chivaluri | 709/253 |
| 5,963,541 A | 10/1999 | Koga et al. | 370/229 |
| 6,021,437 A | 2/2000 | Chen et al. | 709/224 |
| 6,038,219 A | 3/2000 | Mahwinney et al. | 370/242 |
| 6,094,681 A | 7/2000 | Shaffer et al. | 709/224 |
| 6,125,390 A | 9/2000 | Touboul | 709/223 |
| 6,145,001 A | 11/2000 | Scholl et al. | 709/200 |
| 6,167,445 A | 12/2000 | Gai et al. | 709/223 |
| 6,185,189 B1 | 2/2001 | Brassier et al. | 370/236 |
| 6,185,613 B1 | 2/2001 | Lawson et al. | 709/224 |
| 6,222,844 B1 | 4/2001 | Han et al. | 370/397 |
| 6,233,449 B1 | 5/2001 | Glitho et al. | 455/423 |
| 6,243,747 B1 | 6/2001 | Lewis et al. | 709/220 |
| 6,256,315 B1 | 7/2001 | Barbas et al. | 370/412 |
| 6,269,330 B1 | 7/2001 | Cidon et al. | 714/712 |
| 6,104,700 A1 | 8/2001 | Haddock et al. | 370/445 |
| 6,275,855 B1 | 8/2001 | Johnson | 709/224 |
| 6,298,041 B1 | 10/2001 | Packer | 370/231 |
| 6,349,332 B2 | 2/2002 | Hayball et al. | 709/223 |
| 6,349,335 B1 | 2/2002 | Jenney | 709/224 |
| 6,356,560 B1 | 3/2002 | Venters et al. | 370/462 |
| 6,370,116 B1 | 4/2002 | Giroux et al. | 370/389 |
| 6,381,639 B1 | 4/2002 | Thebaut et al. | 709/222 |
| 6,405,250 B1 | 6/2002 | Lin et al. | 709/224 |
| 6,427,165 B1 * | 7/2002 | Anderson | 709/217 |
| 6,445,679 B1 * | 9/2002 | Taniguchi et al. | 370/232 |

* cited by examiner

POLICY ENGINE WHICH SUPPORTS APPLICATION SPECIFIC PLUG-INS FOR ENFORCING POLICIES IN A FEEDBACK-BASED, ADAPTIVE DATA NETWORK

RELATED APPLICATION DATA

This application is a divisional of application Ser. No. 09/342,337, filed Jun. 29, 1999, now U.S. Pat. No. 6,505,244, from which priority under 35 U.S.C. §120 is claimed, and such application is incorporated herein by reference in its entirety and for all purposes.

This invention is related to U.S. patent application Ser. No. 09/342,743 filed Jun. 29, 1999, now U.S. Pat. No. 6,539,427, naming Shankar Natarajan, Andrew G. Harvey, Hsuan-Chung Lee, Vipin Rawat, and Leo Pereira as inventors, and entitled "Dynamically Adaptive Network Element in a Feedback-Based Data Network". That application is incorporated herein by reference in its entirety and for all purposes.

This invention is related to U.S. patent application Ser. No. 09/342,321, filed Jun. 29, 1999, now U.S. Pat. No. 6,577,597, naming Shankar Natarajan, Andrew G. Harvey, Hsuan-Chung Lee, Vipin Rawat, and Leo Pereira as inventors, and entitled "Dynamic Adjustment Of Network Elements Using A Feedback-Based Adaptive Technique". That application is incorporated herein by reference in its entirety and for all purposes.

This invention is related to U.S. patent application Ser. No. 09/342,742, filed Jun. 29, 1999, still pending, naming Shankar Natarajan, Andrew G. Harvey, Hsuan-Chung Lee, Vipin Rawat, and Leo Pereira as inventors, and entitled "Technique for Collecting Operating information from Network Elements, and for Controlling Network Element Behavior in a Feedback-Based, Adaptive Data Network". That application is incorporated herein by reference in its entirety and for all purposes.

This invention is related to U.S. patent application Ser. No. 09/342,341, filed Jun. 29, 1999, still pending, naming Shankar Natarajan, Andrew G. Harvey, Hsuan-Chung Lee, Vipin Rawat, and Leo Pereira as inventors, and entitled "Technique for Providing Dynamic Modification of Application Specific Policies in a Feedback-Based, Adaptive Data Network". That application is incorporated herein by reference in its entirety and for all purposes.

This invention is related to U.S. patent application Ser. No. 09/342,744, filed Jun. 29, 1999, still pending, naming Shankar Natarajan, Andrew G. Harvey, Hsuan-Chung Lee, Vipin Rawat, and Leo Pereira as inventors, and entitled "Technique for Providing Automatic Event Notification of Changing Network Conditions to Network Elements in an Adaptive, Feedback-Based Data Network". That application is incorporated herein by reference in its entirety and for all purposes.

BACKGROUND OF THE INVENTION

1. Field of the Invention

The present invention relates generally to data networks, and more specifically to a technique for providing a feedback-based data network for dynamically adapting to changing network conditions.

2. Background

The merging of computers and communications has had a profound influence on the way computer systems are organized. As computer technology advances, the role of computer networks steadily increases. Various types of computer networks include internetworks (e.g., the Internet), local area networks (LANs), metropolitan area networks (MANs), and wide area networks (WANs).

The use of networks such as LANs or WANs allows data or other information to be exchanged over large distances at a reasonable speed, and at relatively low cost. Although conventional network systems are advantageous for a variety of reasons, implementing and maintaining such networks presents an ongoing problem. Moreover, a network may span a plurality of separate LANs and/or WANs to create the impression of a unified network. This has greatly complicated the implementation, maintenance, and control of system parameters within the network.

As the use of computer networks proliferates, there exists an increasing need to improve computer network designs and implementations in order to facilitate the management, implementation, and modification of such networks.

SUMMARY OF THE INVENTION

According to specific embodiments of the invention, a technique is provided for implementing a feedback-based data network which is able to automatically and dynamically monitor characteristics of various aspects of the network and adapt to changing network conditions by dynamically and automatically modifying selected network parameters in order to achieve a desired performance level.

According to specific embodiments of the present invention, a method and computer program product are disclosed for providing dynamic feedback control of network elements in a data network. The data network includes a plurality of network elements, wherein each of the network elements has a plurality of operating parameters associated therewith. The operating parameters associated with a particular network element are related to at least one control parameter of that element. Information relating to a first subset of network elements is retrieved from a first data source. At least a portion of the retrieved information is then analyzed using selected guidelines to determine whether a performance of at least a portion of the network conforms with predetermined criteria. Updated control information for at least one network element may then be automatically generated based upon the analysis of the retrieved information. An additional aspect of this embodiment provides that the generated control information may then be used to affect the operation of at least one network element to thereby cause that network element to adapt to changing conditions in the network.

Alternative embodiments of the present invention are directed to a method and computer program product for providing dynamic feedback control of network elements in a data network. The data network includes a plurality of network elements, wherein each of the network elements has a plurality of operating parameters associated therewith. The operating parameters associated with a selected network element are related to at least one control parameter of that element. An application specific policy for analyzing an aspect of network performance is loaded. Selected information associated with a first subset of network elements is then acquired. The selected information is related to the aspect of network performance being analyzed. The selected information is then analyzed in accordance with the specific policy which has been loaded. Updated control information for at least one network element may then be automatically generated based upon the analysis of the selected information. The updated control information may be used for affecting an aspect of network performance. Further, the updated control information may be used to configure at least one network element to dynamically and automatically adjust to changing conditions in the network.

An alternative embodiment of the present invention is directed to a policy engine for providing dynamic feedback control of network elements in a data network. Each of the network elements has a plurality of operating parameters associated therewith. The operating parameters associated with a particular network element are related to at least one control parameter of that element. The policy engine comprises at least one CPU, memory, and at least one interface for retrieving information related to a first subset of network elements from a first data source. The policy engine is operable to analyze at least a portion of the retrieved information using selected guidelines to determine whether a performance of at least a portion of the network conforms with predetermined criteria. The policy engine is further operable to automatically generate updated control information for at least one network element based upon the analysis of the retrieved information. If, during the analysis of the retrieved information, it is determined that conditions in the network have changed, the updated control information may be used to affect the performance of at least one network element. In a specific embodiment, the updated control information may be used to cause a network element to automatically and dynamically adapt to the changing network conditions.

A further embodiment of the present invention is directed to a policy engine for providing dynamic feedback control of network elements in a data network. Each of the network elements has a plurality of operating parameters associated therewith. The operating parameters associated with a particular network element are related to at least one control parameter of that element. The policy engine comprises at least one CPU, and memory configured to store specific policies for analyzing selected aspects of network performance. The policy engine is operable to use a selected policy to analyze an aspect of network performance based upon selected information associated with a first subset of network elements. A policy engine is further operable to automatically generate updated control information for at least one network element based upon the analysis of the selected information. The updated control information may be used for affecting the aspect of network performance being analyzed. Further, the updated control information may be used to affect the operation of at least one network element.

Additional features and advantages of the present invention will become apparent from the following descriptions of its preferred embodiments, which descriptions should be taken in conjunction with the accompanying drawings.

DETAILED DESCRIPTION OF THE PREFERRED EMBODIMENTS

Figure 1:
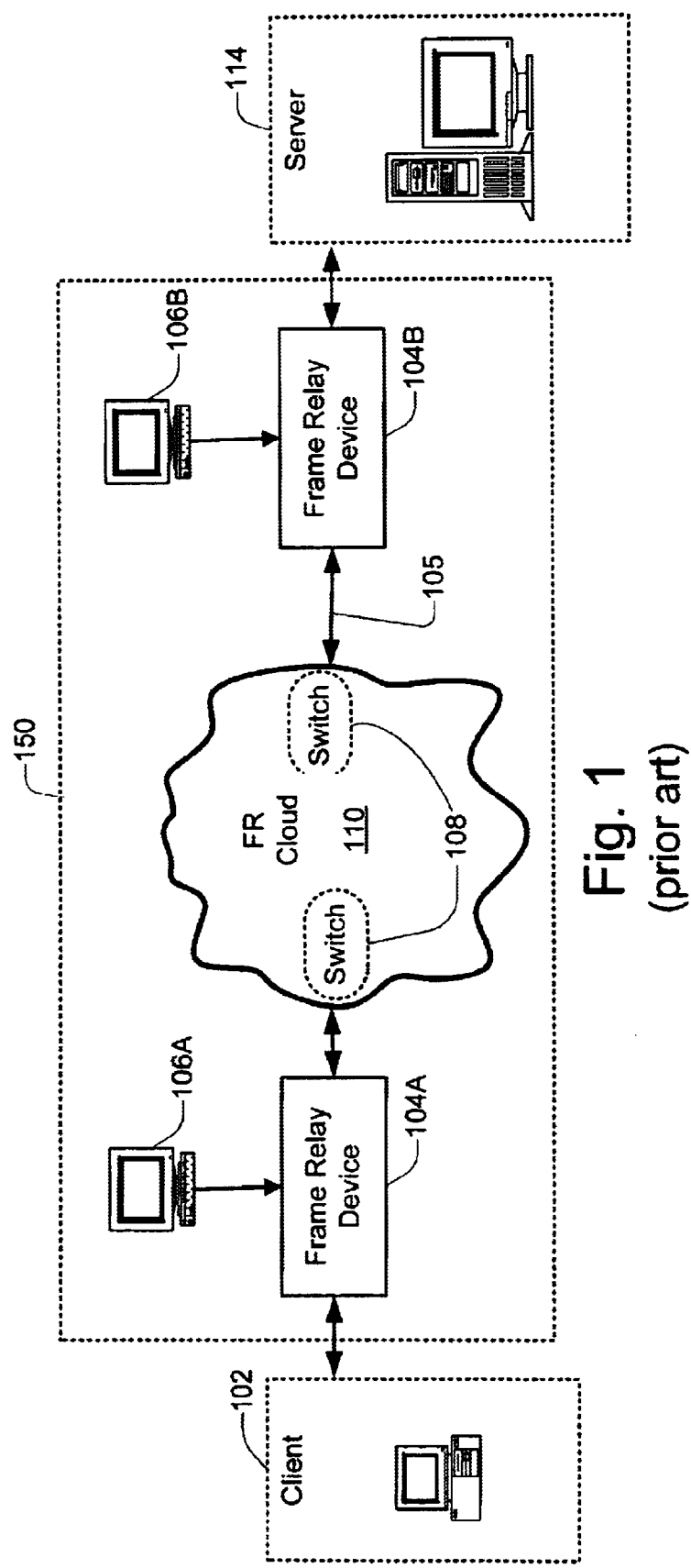
FIG. 1 shows an example of a schematic block diagram of a conventional frame relay network 150.

FIG. 1 shows an example of a frame relay network. The frame relay network may be thought of as comprising a group of frame relay virtual circuits for transmitting data between a first user/computer system and a second user/computer system. A frame relay virtual circuit represents a high-speed packet switching path used in wide area networks. It has become very popular for LAN to LAN connections across remote distances. A consumer may lease a frame relay virtual circuit between two points and send packets of information between the two points. It is also possible to lease frame relay circuits between a given site and multiple other sites.

As shown in FIG. 1, a frame relay network with one frame relay virtual circuit 150 connects a client computer 102 with a server 114. Typically a service provider charges for access at both ends of the network. When leasing the frame relay virtual circuit, the consumer agrees to pay a specified amount of money in return for the service provider guaranteeing a time-averaged bandwidth for the virtual circuit.

One difference between a physical leased line and a frame relay circuit is that, with the physical leased line, a user pays for a specified amount of bandwidth, and may send traffic all day long at the maximum speed. However, with a virtual circuit, data bursts may be sent at full speed, but the long-term average usage (i.e., committed information rate or CIR) must be at or above a predetermined level.

Typically, when a client is provisioned a virtual circuit, a service provider will guarantee to provide a minimum amount of bandwidth for handling client traffic. More specifically, the consumer pays for, and the service provider agrees to provide, a virtual circuit which is able to handle a specified committed burst size (Bc) of data (e.g. Bc=256K bits) over a specified committed time interval (Tc) (e.g. Tc=1 second). The value Bc/Tc is referred to as the committed information rate (CIR), which specifies the rate at which the virtual circuit will accept data from the consumer. In the example above, the CIR value is equal to 256K bits/sec, meaning that over the span of one second, the service provider guarantees to handle 256Kbits of data.

At times, however, a client may be running an application which requires more than 256K bits/sec of bandwidth. For example, the client may be required to send bursts of traffic at 300K bits/sec from time to time. Although the CIR value represents the average guaranteed bandwidth for the virtual circuit, the service provider also provides an allowance for data bursts. This allowance is referred to as the excess burst size (Be) (e.g. Be=64Kbits). Thus, using the example above, in time Tc (1 second), the Bc value (256K) may be exceeded by Be (64K) without the customer having to pay. This amount of additional bandwidth is referred to as the excess information rate (EIR=Be/Tc), and represents the excess bandwidth which the service provider will attempt to deliver to the consumer. Any data sent by the consumer in excess of the EIR value will be dropped. Further, data bursts which are between the Bc and Be value may be discarded in the event of network congestion.

The frame relay virtual circuit 150 of FIG. 1 comprises a plurality of individual network elements (e.g., 104A, 104B, 108) which are part of a wide area network. Typically, different portions of the wide area network are owned and/or managed by separate entities. For example, the service provider may manage or control the gateways (104A, 104B) for accessing the wide area network from either the client machine 102 or server machine 114. More typically, however, the gateways are controlled by the end user who has the ability to reconfigure these devices. Gateway devices 104A and 104B may, in turn, communicate with frame relay cloud 110, which may be managed or controlled by a separate entity such as, for example, a data network company (e.g., AT&T, MCI, Sprint, etc.). Typically, the frame relay service provider and the frame relay carrier are the same entity.

In the example of FIG. 1, devices 104A and 104B represent frame relay devices, such as, for example, routers which are configured to handle frame relay protocol. Each of the frame relay devices 104A, 104B are typically statically configured by a system administrator using a command line interface (CLI) via a local console (106A, 106B, respectively). Each terminal 106A, 106B is connected directly to its respective Frame relay device via a local console port (not shown) at the device. The virtual circuit between frame relay device 104A and frame relay device 104B is provided by the FR cloud network 110, maintained and controlled by the frame relay service provider. The FR cloud includes a plurality of switching devices (108) which are statically configured by a system administrator to provide virtual circuits, each circuit having a specified CIR and EIR value. When a service provider provisions a virtual circuit having specific CIR and EIR values, a human technician is hired to provision the circuit by statically configuring specific network elements within the cloud to form the desired communication path having the specified CIR and EIR values.

Conventionally, the provisioning of a virtual circuit by a service provider requires not only manual configuration of frame relay devices 104A, 104B, but also requires coordination between the end user and the service provider which manages the FR cloud 110. This coordination usually takes place by sending a request to the service provider to implement or modify a virtual circuit within FR cloud 110. Once the request is received by the service provider, it is handled manually by a service technician who statically configures the various switches and other devices within the FR cloud 110 to implement a virtual circuit having specified CIR and EIR values. Because of the manual steps involved, it is not uncommon for days to pass before the consumer (e.g., client 102) is able to use the virtual circuit.

Moreover, significant delays may be experienced when attempting to modify or reconfigure parameters associated with a virtual circuit. For example, let us suppose that the consumer initiates a video conferencing application between client 102 and server 114. Further, let us suppose that the current CIR and EIR bandwidth values for virtual circuit 150 are insufficient for supporting high quality video/voice applications, resulting in the client 102 receiving poor quality video images and voice information from server 114. In order to overcome this problem, a human operator at the client side may send a request to the service provider to increase the CIR value for the virtual circuit 150.

However, in order to increase the CIR and/or EIR values on the virtual circuit 150, a plurality of network elements within the WAN which form the communication path between client machine 102 and server 114 must be statically reconfigured by a human operator to support the new CIR and EIR values. Thus, when the request from the human operator at client side is received at the service provider end, a system administrator or other service technician must statically reconfigure each of the network elements which form the virtual circuit connecting client 102 with server 114. This may include statically reconfiguring frame relay devices 104A and 104B (via local console/terminals 106A, 106B, respectively), and also may include reconfiguring the appropriate switches 108 and/or other devices which are part of FR cloud. This manually implemented, time consuming procedure is extremely undesirable.

Additionally, it should be noted that parameters in conventional frame relay network devices are typically derived from a static on-board configuration having minimal interaction with the provisioning switching device in the network and no interaction with the far end device that terminates the circuit. The presence of various network elements in the network implies that no network element is an isolated entity, but rather is affected by other network elements that surround it. Accordingly, control actions performed on one network element can affect other network elements. Since the performance of the "switching fabric" can affect the performance of the "edge devices", it is preferable to provide a network model which is able to accommodate the "multi-variable" nature of networks and implement a control scheme wherein information from at least a portion of related network elements is collected before a management or control decision is made at a particular network element.

Using the technique of the present invention, a dynamic feedback-based adaptive network may be provided for automatically detecting a client's need for increased bandwidth, and for automatically and dynamically reconfiguring the appropriate network elements to provide sufficient bandwidth on the virtual circuit to support the user's current application(s). The feedback-based adaptive network of the present invention monitors current conditions of local and/or remote network elements and dynamically adjusts network control parameters based upon analysis of the monitored network elements. A specific embodiment of the dynamically configurable feedback-based adaptive network of the present invention is shown in FIG. 2 of the drawings.

The feedback-based adaptive network of the present invention utilizes a technique wherein at least a portion of the network elements (e.g., 204A, 204B, 208A, 208B, etc.) report network information relating to network conditions to a centralized data storage entity (e.g., data store 252). The reported data corresponds to information relating to the current condition or status of each of the reporting network elements in the network. The information which is reported to the data store 252 is analyzed by a policy engine 254. The policy engine 254 includes a plurality of application specific plug-in policies for analyzing application specific information from the data store and for computing updated control information based upon the analysis of the information. The updated control information may include any type of information, parameters, and/or actions which may be used to affect the operation of one or more network elements. The updated control information is then fed back to selected network elements to thereby affect operation of the selected elements and/or network. Typically, when the operation of a network element has been affected, its corresponding operating parameters and/or operating information will change. The changed operating parameters are then reported to the data store 252 and analyzed by the policy engine 254. The policy engine may then generate new or updated control information or parameters for affecting the operation of selected elements in the network. In this way, the network of FIG. 2 is configured to adapt to changing conditions in the network by providing a dynamic feedback mechanism. Using this dynamic feedback mechanism, selected network elements may be dynamically and automatically reconfigured to cause the performance of various aspects of the network to conform with desired performance criteria.

Figure 2:
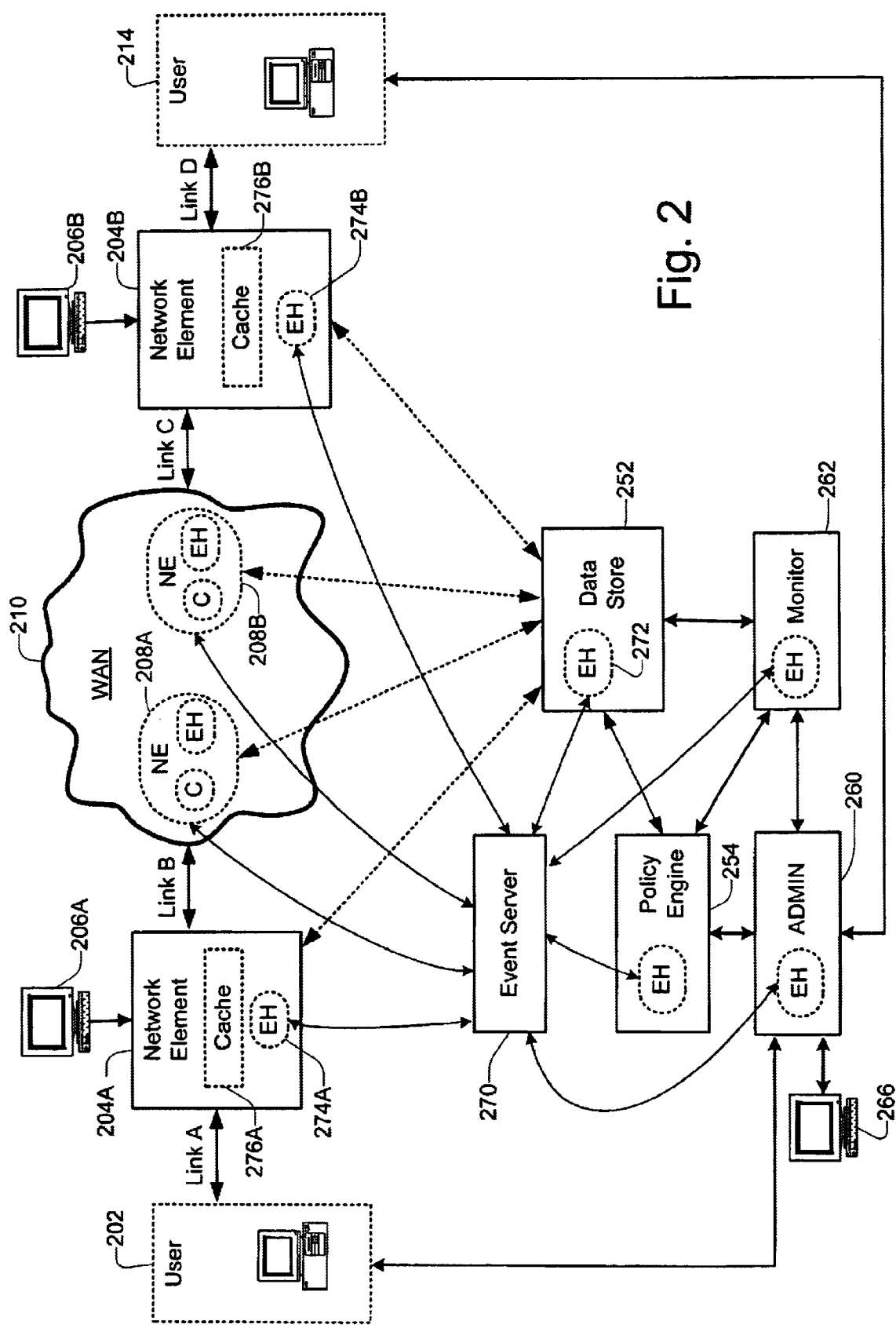
FIG. 2 shows a schematic block diagram of a specific embodiment of the feedback-based, adaptive data network of the present invention.

The feedback-based adaptive network of FIG. 2 includes a plurality of network elements 204A, 208A, 208B, 204B, which are part of the communication path between user 202 and user 214. In the embodiment of FIG. 2, each of the network elements 204A and 204B may be, for example, a server or a router which communicate with each other via a wide area network (WAN) 210. The WAN may include a plurality of network elements (NE) 208A, 208B, which may include switches and/or other network elements for providing a communication link between element 204A and 204B.

It will be appreciated, however, that the dynamic feedback-based adaptive network technique of the present invention may be implemented in any conventional data network for providing adaptive and automatic feedback control of network elements within that network. Thus, for example, the technique of the present invention may be implemented in conventional LANs, WANs, MANs, internetworks, general purpose networks, packet switched networks, circuit switched networks, etc. Moreover, the technique of the present invention may be applied to any conventional data network.

As used in this application, the term "control element" refers to the additional hardware and/or software control components for implementing dynamic feedback control of a conventional network. For example, in the embodiment of FIG. 2, the control elements include data store 252, monitor system 262, ADMIN system 260, policy engine 254, and event server 270. Additionally, as used in this application, the term "network element" refers to any hardware or software component of the adaptive feedback-based network of the present invention, including control elements.

The network element may be a logical or physical entity within the network which is being managed or controlled. The network element is preferably designed with built-in instrumentation which allows for the collection of relevant information which may be subsequently used to determine control actions to be applied to the network element. In the network of FIG. 2, network element 204A may be any hardware or software component which has a measurable parameter that can be reported. Examples of network elements include routers, switches, hosts, modems, terminals, dial access servers, gateways, ports, channels, interfaces, circuits, processes, drivers, protocols, services, applications, etc.

In accordance with a specific embodiment, a network element which has been configured to support the feedback-based adaptive configuration technique of the present invention will include a monitor/agent (not shown) for monitoring, measuring and/or computing information (e.g. state data) and for reporting this information to the data store 252. The monitor/agent may be implemented via hardware, software, or a hybrid combination of hardware and software. The reported information may be used by the policy engine 254 to calculate updated control information for effecting the operation of the network element 204A. As described in greater detail below, there are a number of ways in which the updated control information may be fed back into the network element. Once received, the network element will automatically configure itself utilizing the updated control information to thereby affect its operation, which may include affecting one or more operational parameters of the network elements.

In a specific embodiment where the network element is part of a frame relay circuit, examples of the information reported by the network element may include information relating to: committed information rate (CIR), excess information rate (EIR), committed burst size (Bc), excess burst size (Be), congestion indicators (e.g., discarded eligibility bits), number of packets dropped (e.g. during a given time interval), queue length at selected circuits within the network element, etc. Further, any of the above described parameters may be dynamically and automatically modified or updated by the policy engine and fed back to desired network elements for affecting the operation or performance of the network.

According to the embodiment of FIG. 2, each network element which reports its respective operating information to data store 252, such as, for example network element 204A, includes a local cache 276A and an event handler (EH) 274A for handling event notification/registration. Cache 276A represents any type of memory device which may be used for storing and/or caching updated control information received at the network element. In a specific embodiment, this memory device may be a persistent store. After the updated control information has been cached into local cache 276A, the network element retrieves the updated control information from the cache and re-configures itself using this updated control information. Additionally, as shown in FIG. 2, network elements 208A and 208B may also include respective local caches (C) 276A, 276B for storing updated control information, and may also include respective event handling entities (EH) for receiving/reporting event notification information.

Although many of the various features of the present invention are described with respect to the network element 204A of FIG. 2, it will be appreciated that the descriptions of the various techniques of the present invention are applicable to any network element in the network. However, for purposes of simplification, network element 204A is used in this application to exemplify many of the techniques provided by the present invention.

One advantage of providing a local cache 276A for storing updated control information is that this data will be available for use by the network element even during times when the communication link between the network element and other parts of the network (e.g., data store 252, event server 270, policy engine 254, etc.) have been interrupted. Thus, for example, when the network element is unable to access information from the data store or other network elements, the local cache 276A may be accessed in place of data store 252. In specific embodiments where the protocol for accessing data within data store 252 differs from the protocol for accessing data within data cache 276A, a translation mechanism may be provided. For example, where the data store is implemented as an LDAP server, and the local cache is implemented as a file system, a translation mechanism will be provided at the network element for converting LDAP calls into file system calls and vice versa.

In a specific embodiment, all current control parameters used by a particular network element (e.g. network element 204A) are maintained within its local cache 276A. The network element configures itself using the control information contained within the local cache 276A. Periodically, when the control information for that network element is updated (by policy engine 254, for example), the updated control information is then stored within cache 276A. Thereafter, the network element may reconfigure itself using the updated control information stored within cache 276A. This feature is described in greater detail in a latter section of this application relating to FIGS. 9B and 10 of the drawings. In at least one embodiment, the cache is implemented using non-volatile memory so that the updated control information may be saved in the event of a power failure of the network element.

One advantage of caching the updated control information within cache 276A is that the updated control information may be immediately stored within cache 276A even during times when the network element itself is busy and unable to immediately reconfigure itself using the updated control information. In this way, the device which handles the data transfer and caching operation is able to complete its task without having to wait for the network element to be available for re-configuration before caching the updated information.

In an alternate embodiment, the current control parameters used by the network element are maintained in a main memory of the network element (not shown). In this embodiment, cache 276A functions primarily as a back-up in case of a connection failure with other parts of the network. The updated control information are pushed directly into the main memory of the network element and the control action is immediately implemented. Additionally, the updated control information is stored within cache 276A, which acts as a default/back-up mechanism. When a communication failure occurs and the network element is unable to access the updated control information from the data store, event server, and/or policy engine, the network element resorts to retrieving control parameters from the cache 276A.

As shown in FIG. 2, network element 204A includes an event handler 274A. In a specific embodiment, each network element which receives its control information from the data store includes an associated event notification agent.

In a specific embodiment, the event notification service is implemented using a standardized common object request broker architecture (CORBA) event service API, commonly known to those skilled in the art. However, although the standardized CORBA event service API is generally known to those having ordinary skill in the relevant art, the use of a CORBA event service as a notification mechanism to notify data network elements of changed network conditions and/or parameters is believed to be a novel concept. In an alternate embodiment, the well known simple network management protocol (SNMP) may be used for implementing event notification in the feedback-based adaptive network of the present invention. Alternatively, event notification may be implemented by utilizing IP sockets.

One purpose of event handler 274A is to provide the ability for network element 204A to register with an event server in order to receive notification for specified events, such as, for example, the availability of updated control information at data store 252. In a specific embodiment, event handler 274A may consult a configuration file (residing at element 204A) in order to determine which events to register with at event server 270. This feature is described in greater detail in a latter section of this application relating to FIG. 7 of the drawings.

Another purpose of event handler 274A is to provide the ability for the network element to receive event notification messages from event server 270. Thus, once the event handler has registered for event notification with event server 270, the event handler is then able to receive event notification messages from event server 270, and take appropriate action. This feature is described in greater detail in a latter section of this application relating to FIGS. 9A and 9B of the drawings.

Yet another purpose of the event handler is to monitor specified network elements, and report the detection of specified events (e.g. detected errors) to event server 270. In a specific embodiment, the event handler may consult a local configuration file to determine the particular type of events it is to be monitoring at a specified network element. In an alternate embodiment, the event handler is statically pre-configured so that when it is initialized, it automatically monitors a specified network element for specific types of events and reports detected events to event server 270. For example, when an error is detected by network element 204A, the event handler 274A will report the error to event server 270 to be forwarded to other network and/or control elements (e.g. policy engine 254), which may be interested in this type of information. This feature is described in greater detail in a latter section of this application relating to FIG. 9B of the drawings.

Although a detailed explanation of the event notification service is provided in latter sections of this application, a brief example will now be provided using the network of FIG. 2.

In this example, it will be assumed that network element 204A uses event handler 274A to register for event notification service with event server 270. When the policy engine 254 calculates updated control information for network element 204A, it stores the updated control information in data store 252. Event handler 272 continually monitors the data store for updated control information and other events. In an alternate embodiment (not shown) the event handler 272 may physically reside at a device other than data store 252. When the event handler 272 detects newly updated control information within the data store relating to network element 204A, it notifies event server 270 which, in turn, notifies network element 204A of the updated control information. In one embodiment, the actual control information is passed to the network element and cached within local cache 276A. In an alternate embodiment, notification relating to the availability of updated control information is passed to the network element (via event handler 274A). The network element then responds to this notification by retrieving the appropriate updated control information from data store 252 and caching the retrieved data into cache 276A.

It will be appreciated that the above-described event notification technique may be applied to any desired network element within the network. Further, it will be appreciated that any description of hardware and/or software features relating to a specific network element of the present invention (such as, for example, element 204A) may also be extended to other network elements in the network (e.g., 208A, 208B, 204B).

Generally, the dynamic feedback-based adaptive network element of the present invention may be implemented using software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid of the feedback-based adaptive network element of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the adaptive feedback-based network of this invention may include specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the adaptive feedback-based network may be implemented via a general-purpose network host machine such as a personal computer or workstation. Further, the invention may be at least partially implemented on a card (e.g., an interface card) for a network device or a general-purpose computing device.

Figure 5A:
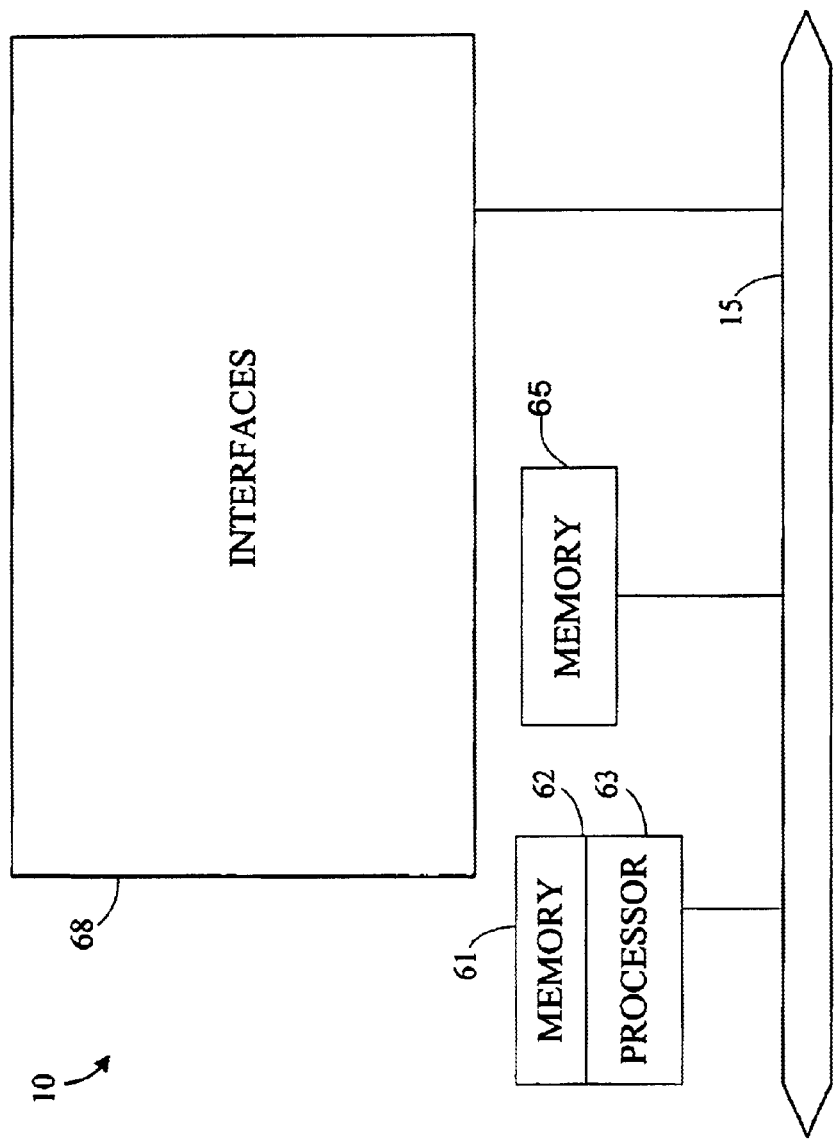
FIG. 5A shows a schematic block diagram of a router 10 which may be implemented as a network element in accordance with the feedback-based, adaptive data network of the present invention.

For example, the network element 204A of FIG. 2 may be a router, such as the router 10 illustrated in FIG. 5A of the drawings. Referring to FIG. 5A, a router 10 is shown which may includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for reporting operating information (relating to the router 10) to one or more external devices, retrieving new or updated control information from an external data source, caching the retrieved control information, receiving event notification messages, generating event messages (relating to the status of router 10), etc. CPU 62 preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 5A is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data and/or store program instructions for the general-purpose network operations and other specific functions described herein. The program instructions may control the operation of an operating system and/or one or more applications, for example. The memory or memories may also be configured to store: current and updated operating information relating to the operation of the device, event notification messages, device configuration information, program instructions for implementing event notification service, program instructions for automatically and dynamically re-configuring the device using updated control information, etc.

Because such information and program instructions may be employed to implement the systems/methods described herein, the present invention relates to machine readable media that include program instructions, operating information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Data Store

As depicted in FIG. 2, data store 252 provides memory for storing current network operating information reported from one or more of the network elements. The data store also provides memory for storing updated network control information generated by the policy engine 254. The data store may exist on a stand alone device which includes its own CPU, and operating system (e.g. Windows NT), and memory. Alternatively, the data store may reside as a virtual device at any one of the network elements. In a specific embodiment (not shown) a plurality of data store devices may be provided in the network. Where multiple data store devices are provided, the information within each data store may be redundant (e.g. for back-up purposes or to provide rapid access by network elements). Alternatively, specific data stores may service selected portions of the networks in which case the information within each data store may not be redundant.

Each data store may be implemented as a database, a flat file, a directory, data cache, or other data storage server implemented on top of some type of data storage media. In a specific embodiment, data store 252 of FIG. 2 is implemented as a directory server which supports the light-weight directory access protocol (LDAP). The LDAP protocol is commonly known to those having ordinary skill in the art.

In a specific embodiment, the data store may be implemented using the Microsoft Active Directory (by Microsoft Corporation of Redmond, Wash.) or the Novell Directory (by Novell Corporation of Provo, Utah). One purpose of the data store in the feedback-control loop is to collect and store current network operating information for subsequent analysis. Collecting the operating information allows for flexibility in the control mechanism of the feedback-based network.

Figure 5B:
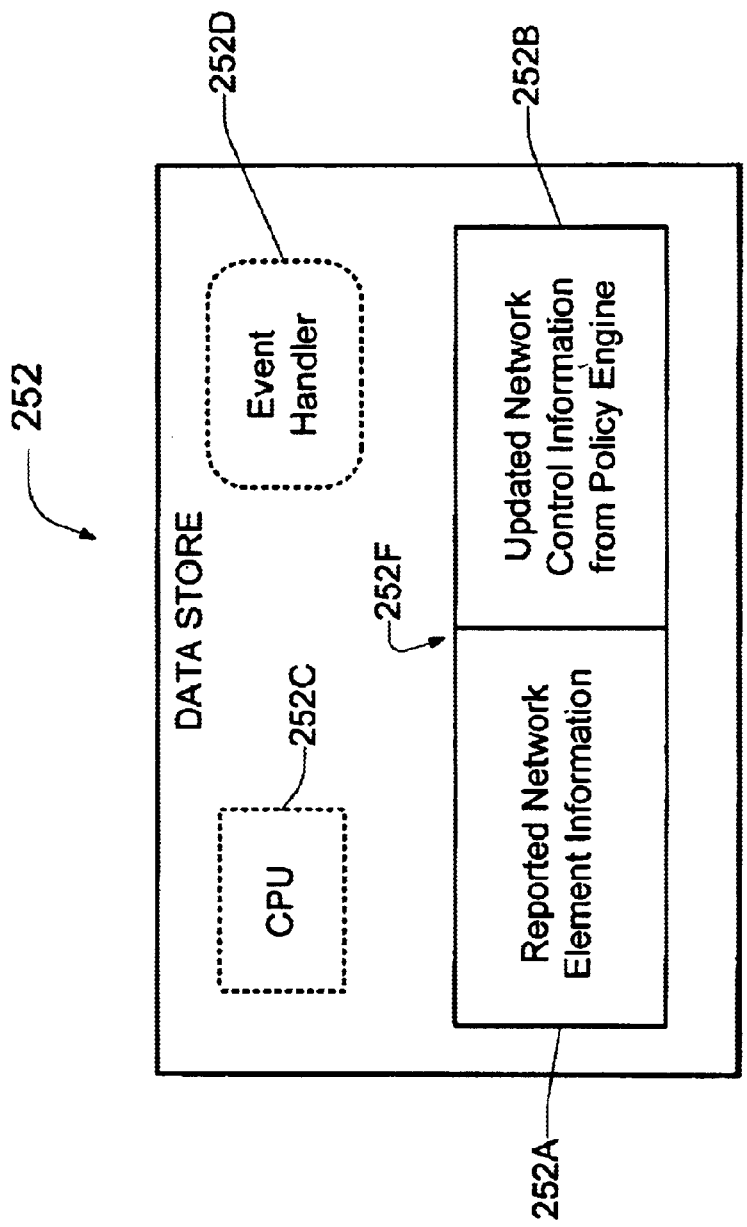
FIG. 5B shows a schematic block diagram of data store 252 of FIG. 2, in accordance with a specific embodiment of the present invention.

An example of data store 252 is shown in FIG. 5B of the drawings. As shown in FIG. 5B, data store 252 includes a CPU 252C (which may be shared with other devices or agents), an event handling entity 252D, and a data storage block 252F having memory for storing network information. Memory block 252A may be used for storing operational information reported by the various network elements. This information is used by the policy engine (254, FIG. 2) to calculate updated control information related to the various network elements. The new or updated control information generated by the policy engine will be stored in block 252B of the data store. The event handler 252D monitors the data stored in block 252B as part of the event notification service.

Policy Engine

As described above, in one embodiment of the present invention, updated network conditions from the various network elements are constantly fed into data store 252. The information in the data store powers a policy engine which, in turn, effects changes in the network. When updated network conditions are fed into the data store, it is important that the policy engine be notified of the updated network operating information. The policy engine may either repeatedly poll the data store for updated network data, or rely on an event service to be notified that a change in the network conditions has occurred. When alerted to changes in network conditions, the policy engine 254 is then triggered to perform its application specific tuning function.

Figure 5C:
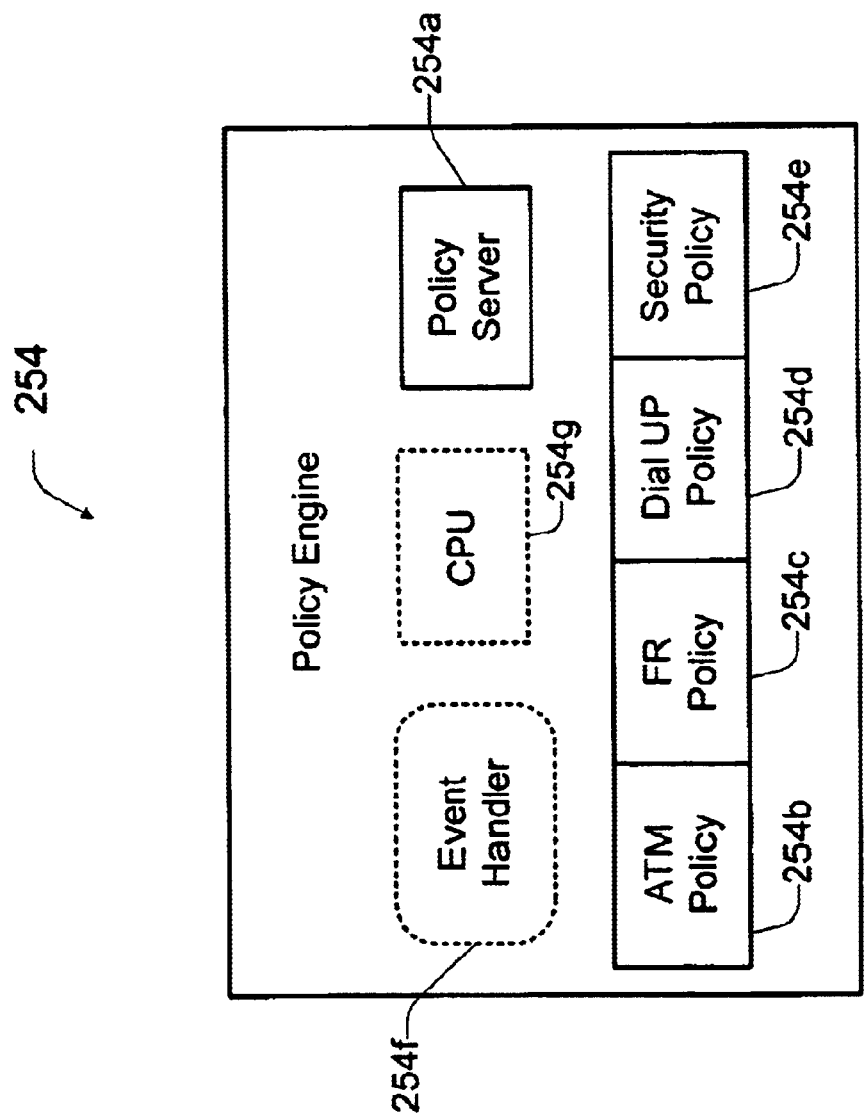
FIG. 5C shows a schematic block diagram of policy engine 254 of FIG. 2, in accordance with a specific embodiment of the present invention.

The policy engine 254 is a decision-making (logical) component of the feedback-based adaptive network of the present invention. An example of a policy engine 254 is illustrated in FIG. 5C of the drawings. As shown in FIG. 5C, the policy engine 254 includes a policy server 254a, a CPU 254g (which may reside at the policy server or other device), an event handling entity 254f, and a plurality of application specific plug-in policies 254b–e. An application specific policy is decision tree that allows the policy server to make a decision based upon measured variables and conditions. The definition of "policy" varies based upon the perspective of the user. In the case of management and control of network elements, a policy is a corrective action which is used to restore the network element to a pre-determined state.

In a specific embodiment, the policy engine may be implemented on a stand alone device which includes CPU, an operating system such as, for example, Solaris (manufactured by Sun Microsystems of Mountain View, Calif.) or Windows NT (manufactured by Microsoft Corporation of Redmond, Wash.), memory, and a storage device such as disk storage for storing a policy library of plug-in policies. Alternatively, the policy engine may be implemented as a virtual device which resides on one of the network elements such as, for example, a router. Additionally, the policy engine may be implemented with neural networks or with other artificial intelligence technologies.

The overall architecture of the policy engine is such that it allows for application specific plug-in policies to be added or deleted from the system. The policy server design is made modular so that decision tree modules can be added and deleted at will without disruption to the policy engine. Each application specific plug-in policy module (254b–254e) may be implemented as a plug-in to the policy server 254a. Application specific policy plug-ins include frame relay policies, ATM policies, dial up policies, traffic shaping policies, quality of service (QoS) policies, security policies, admin policies, SLA policies, etc. Examples of various application specific policy plug-ins are shown in FIG. 5C, and include an ATM policy plug-in 254b, a frame relay policy plug-in 254b, a dial up policy plug-in 254b, and a security policy plug-in 254e. The examples shown in FIG. 5C merely illustrate some of the various application specific policy plug-ins which may be attached to the policy server 254A.

Each application specific plug-in policy module may include one or more policies. For example, the frame relay policy plug-in 254c may include a first policy for controlling the CIR parameter of a frame relay circuit, and may include a second policy for controlling the EIR parameter of a frame relay circuit. Each policy contains a specific set of rules for analyzing specific information from selected network elements, and for generating updated control information in response to the analysis of the gathered information. The policy may include protocol specific rules, business logic rules, event notification rules, etc. Further, as described in greater detail below, the policies may be dynamically re-configured during run-time, meaning that a specific policy may be dynamically modified in situations, such as, for example, where it is determined that the current policy for controlling an aspect of network performance is ineffective.

In a specific embodiment, the policies which form part of the policy engine may be stored in a policy library. Each policy may be implemented as a decision tree comprised of nodes, wherein at each node an action may be performed if specified criteria is satisfied. The policy may be configured as an application or program which runs on top of the operating system of the policy server. The policy engine traverses the decision trees of the various policies. Policies may be used to monitor, manage, and/or control a variety of network characteristics including quality of service (QoS), security, access, usage, etc.

Thus, for example, the policy engine may be used to implement policies at one end of the frame relay link based upon conditions at the other end of the link. If a link that is downstream from a switching network experiences congestion, the policy engine will dynamically control the upstream link to adapt to the network conditions so that the downstream network does not drop any packets.

Figure 12:
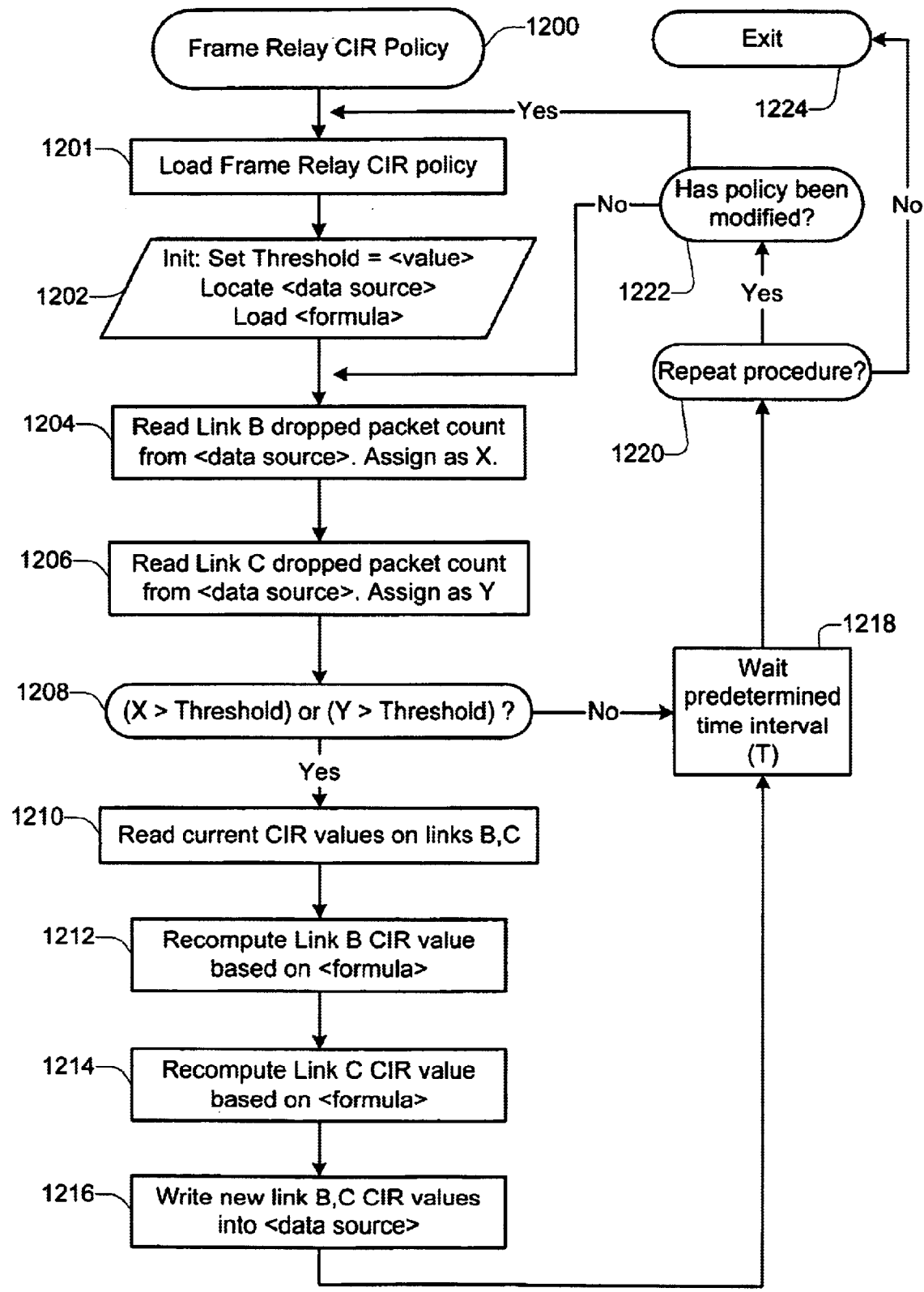
FIG. 12 shows a flow diagram example of a frame relay CIR policy 1200 which may be implemented by procedure 1100 of FIG. 11.

FIG. 12 shows an example of a flow diagram representing a CIR policy (or decision tree) for a frame relay network. The frame relay CIR analysis policy 1200 is responsible for analyzing CIR information reported to the data store, and for generating updated CIR values based upon the analysis of the reported information. The updated CIR data may then be used by various elements in the network to modify or affect each element's respective behavior or operation (thereby affecting operation of the network). In this way, the network elements are able to automatically and dynamically adapt to changing network conditions.

In a specific embodiment, each block within the flow diagram of FIG. 12 represents one or more nodes in a policy tree of the frame relay CIR policy 1200. The policy 1200 of FIG. 12 may be traversed by a policy server which has been configured to analyze each node in the policy tree and take appropriate action in response to the analysis. An example of a policy analysis procedure is shown in FIG. 11 of the drawings.

Figure 11:
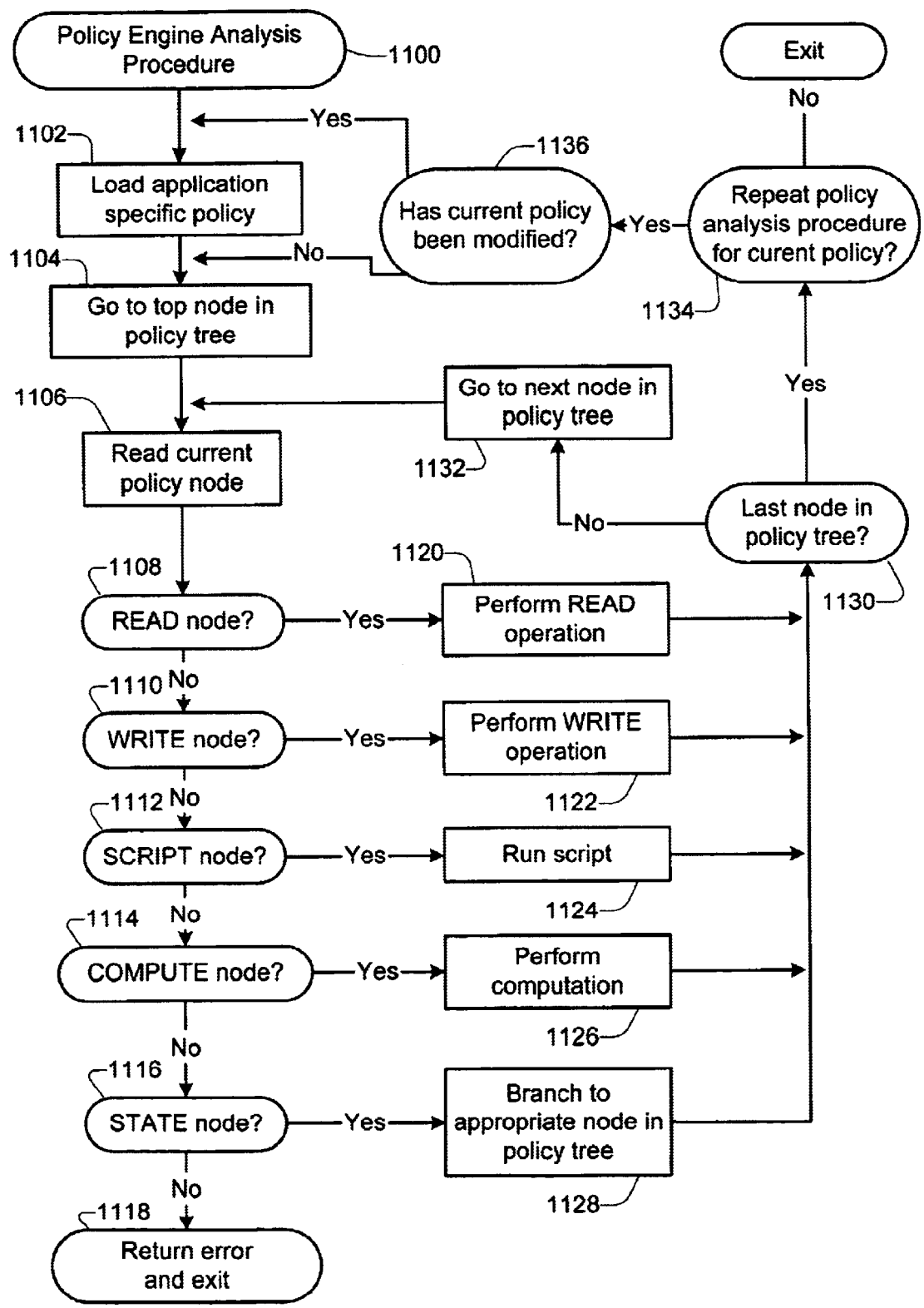
FIG. 11 shows a specific embodiment of a flow diagram of a policy engine analysis procedure 1100, which may be implemented by the policy engine 254 of FIG. 2.

FIG. 11 shows an example of a flow diagram of a policy analysis procedure 1100 which may be used for traversing nodes in a policy tree such as the policy tree described in FIG. 12. At 1102, a specific application policy is loaded into the policy server for execution. The application specific policy may be automatically loaded upon on initialization of the policy analysis procedure, or may be loaded subsequently upon the occurrence of an event, such as, for example, the execution of a specific user application. In a specific embodiment, the policy analysis procedure 1100 is a multiple threaded process with each thread running its own application specific policy. Alternatively, the policy analysis procedure 1100 may be implemented as multiple processes or as a single threaded process with multiple concurrent runtime instances. It will be appreciated that either of these embodiments allows for multiple policy processes to be running concurrently in order to dynamically control various aspects of the network performance.

Starting at the top of policy tree (1104), the current node in the policy tree is read (1106). If the current node is a read node (1108), then the policy server performs the specified read operation (1120). If the current node is a write node (1110), the policy server performs the specified write operation (1122). If the current node is a script node (1112), the policy server runs the specified script (1124). A script node may be composed of multiple read nodes, write nodes, state nodes, computation nodes, etc. Script nodes compute the next state in the policy tree based upon the results of the computation. If the current node is a compute node (1114), the policy server performs the specified computation (1126). If the current node is a state node (1116), the policy server branches to the appropriate node in the policy tree (1128). If the format or instructions at the current node are not recognized, an error is returned and the policy tree is exited (1118). Moreover, where an error occurs, the processing of the policy is aborted.

After the policy analysis procedure has performed the appropriate action in accordance with the current node in the policy tree, a determination is made as to whether the current node is the last node in the policy tree (1130). If the current node is not the last node in the policy tree, the policy analysis procedure proceeds (1132) to the next node in the policy tree, whereupon the next node is processed as described above (e.g. starting at block 1106).

If, however, the current node in the policy tree is the last node in the policy tree, at 1134, a determination is made as to whether the policy analysis procedure should be repeated for the currently loaded policy. In some instances, it may be desirable to have specific policies continuously running in order to provide continuous monitoring and/or updating of network parameters. In other instances, it may be desirable to have a specific policy procedure analysis concurrently running only while a specific user application is running.

If it is determined that the policy analysis procedure is not to be repeated for the currently loaded policy, the policy analysis procedure is exited. However, if it is determined that the policy analysis procedure is to be repeated for the currently loaded policy, at 1136, a determination is made as to whether the current policy has been modified by other control elements in the network. As described in greater detail in a latter section of this application, a policy within policy engine 254 may be dynamically modified in order to alter the way in which that policy effects control of the network. In a specific embodiment, for example, when a specific policy has been modified, an associated register or flag may be set. At block 1136, this flag or register may be checked to determine if the code for the currently loaded policy has been modified. If it is determined that the currently loaded policy has been or is about to be modified, the modified policy is then loaded (1102) and executed by the policy server. If, however, it is determined that the currently loaded policy has not been or is not about to be modified, the policy analysis procedure returns to the top node in the policy tree (1104) and repeats the analysis procedure of the current policy as described above.

By way of example, the policy analysis procedure 1100 of FIG. 11 will now be applied to the frame relay CIR policy tree of FIG. 12. The frame relay CIR policy analysis procedure of FIG. 12 may be used, for example, to provide updated CIR parameter data to frame relay network elements 304A and 304B of FIG. 3 based upon the number of packets dropped on links B and C of FIG. 3. Using the technique of the present invention, adaptive frame relay parameter handling can be expanded to support complex situations without operator intervention.

Referring to FIG. 12, at 1201, the frame relay CIR policy is loaded by the policy analysis procedure 1100. After the frame relay CIR policy has been loaded by the policy server, at 1202, various parameters are initialized. The values used for parameter initialization may be derived, for example, from a configuration file associated with the frame relay CIR policy. The specific parameters initialized in box 1202 describe a threshold value (representing a maximum allowable value of dropped packets for a given link), a data source for retrieving network element information and for writing updated control information (e.g., data store, network element), and specific formulae used for computing updated CIR values based upon the number of packets dropped from a particular link.

After the initialization parameters have been set, at 1204, the packet dropped count data for link B is retrieved from the specified data source and assigned to the variable X. In a specific embodiment, the specified data source is data store 352. In an alternate embodiment, the specified data source may be network element 304A. However, for purposes of this example, it will be assumed that the data source is data store 352. Next, the dropped packet count for link C is read (1206) from the data store and assigned to the variable Y.

At 1208, the dropped packet count values from links B and C are each compared with the threshold dropped packet count value (set during initialization at 1202). If the dropped packet count value for either of links B or C do not exceed the established threshold value, then it may be inferred that the current CIR values for links B and C are adequate for achieving a desired network performance which conforms with predetermined criteria or specified guidelines. In the example of FIG. 12, network performance is determined using predetermined criteria which is related to the threshold value of the dropped packet count for links B and C. Thus, if the dropped packet counts for links B and C conform with (i.e., are less than or equal) the predetermined criteria specified by the threshold dropped packet count value, that particular aspect of network performance is determined to be adequate. Accordingly, the existing CIR values for links B and C need not be modified or updated at the present time. The CIR analysis then continues at block 1218 wherein the frame relay CIR policy procedure waits (1218) a predetermined time interval (T) (e.g. 5 sec.–30 sec.) before either repeating the procedure (1220) or exiting the procedure (1224).

If either of the dropped packet count values from links B or C exceeds the threshold dropped packet count value, it may be inferred that at least one of the CIR values for links B and/or C is inadequate for maintaining a dropped packet count for each of the links below the threshold value. Accordingly, in order to adapt to this change in the network conditions, the CIR values for links B and C are recomputed.

In order to re-compute the CIR values for links B and C, the current CIR values for these links are retrieved (1210) from either the data store or directly from the appropriate network elements. Next, the CIR value for link B is recomputed (1212) based upon a specified formula which may be provided by, for example, a configuration file related to the frame relay CIR policy. Similarly, at 1214, the CIR value for link C is recomputed based upon the specified formula.

An example of one formula which may be used for computing updated CIR values is:

New CIR value=old CIR value*(1+N)*K, where fraction $$N = \frac{\text{Dropped\_Bits/Sec}}{CIR},$$

0<N<1, and K is a predetermined constant (e.g. K=1) which may be dynamically adjusted to alter the ratio between the old CIR value and the new CIR value for a specified link. As explained in greater detail in a latter section of this application, each policy within the policy engine may be dynamically modified upon determining that the current policy procedure is ineffective in controlling an aspect of the network performance to conform with predetermined guidelines or criteria. Thus, in the example of FIG. 12, if it is determined that current formula used for re-computing the CIR values is ineffective in reducing the dropped packet count for links B and C, the formula may be dynamically and automatically altered, for example, by changing the value of the variable K.

Once the updated CIR parameter values for links B and C have been computed (at 1212 and 1214), the updated CIR parameter values are then written (1216) into the data store 352. The frame relay CIR policy procedure then waits (1218) a predetermined time interval (e.g. 0–30 minutes) before either repeating the procedure or exiting the procedure.

After the predetermined time interval has elapsed, a determination is made as to whether the frame relay CIR policy procedure 1200 is to be repeated. This determination may be implemented using a variety of commonly known techniques, for example, by consulting a specific status flag, by polling, by receiving instructions from an external source, etc. If it is determined that the CIR policy procedure is to be repeated, at 1222, a determination is made as to whether the policy has been modified. In a specific embodiment, this determination is made by consulting a policy modification flag associated with the frame relay CIR policy. If, it is determined that the policy has not been modified, then the CIR policy procedure 1200 resumes at block 1204.

However, if it is determined that the policy has been modified, the procedure resumes starting at block 1201, whereupon the modified policy is loaded for execution. Additionally, the policy modification flag may be reset at this time. For example, if the formula for re-computing the CIR values has been modified at any time during execution of the CIR policy 1200, a policy modification flag would be set to indicate that the policy has been modified. Thereafter, if the CIR policy is repeated or subsequently executed, the modified formula will be loaded at initialization and will be used for computing the new CIR values for the appropriate links.

Figure 3:
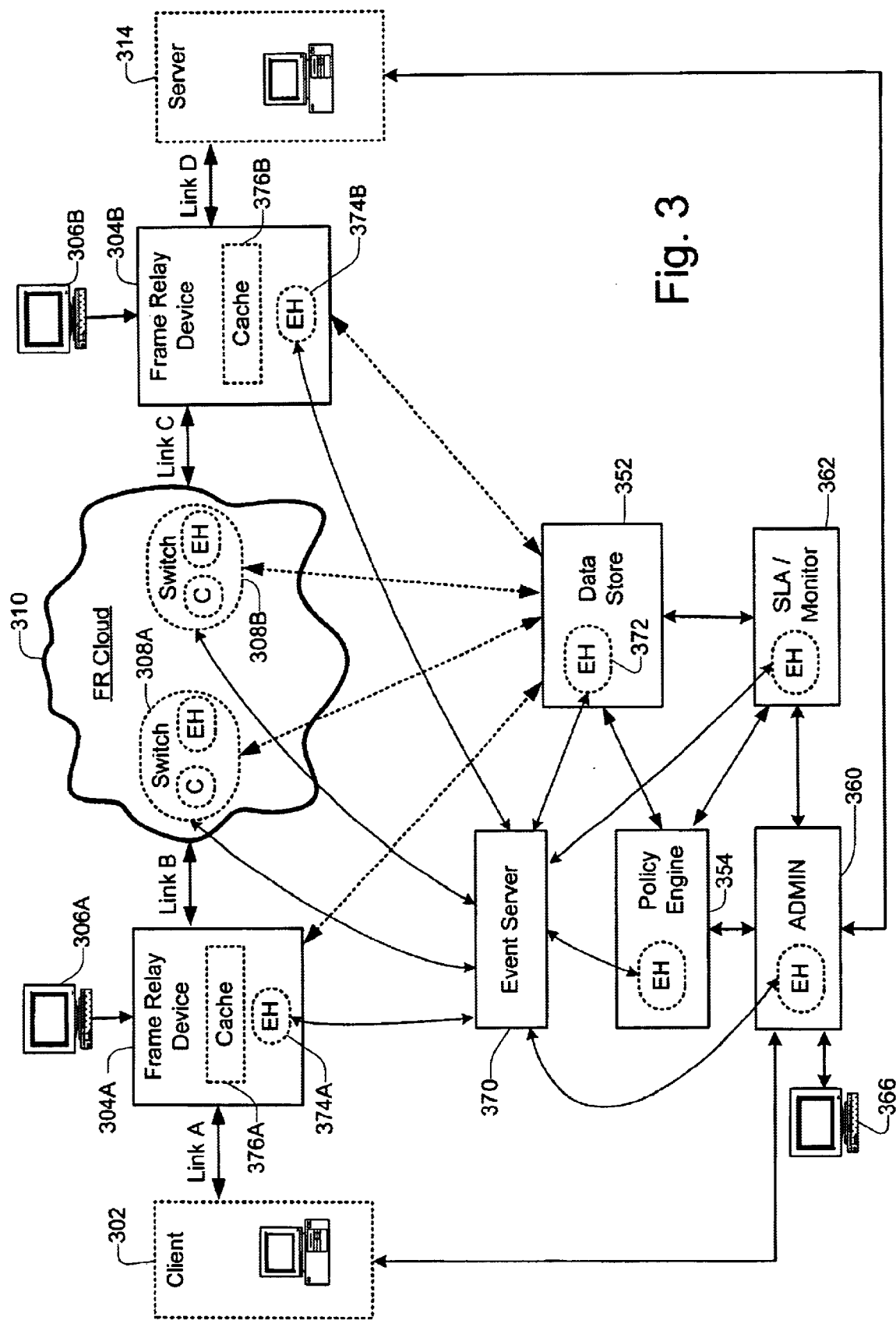
FIG. 3 shows a schematic block diagram of the adaptive feedback-based data network of FIG. 2, implemented as a frame relay network.
Figure 4:
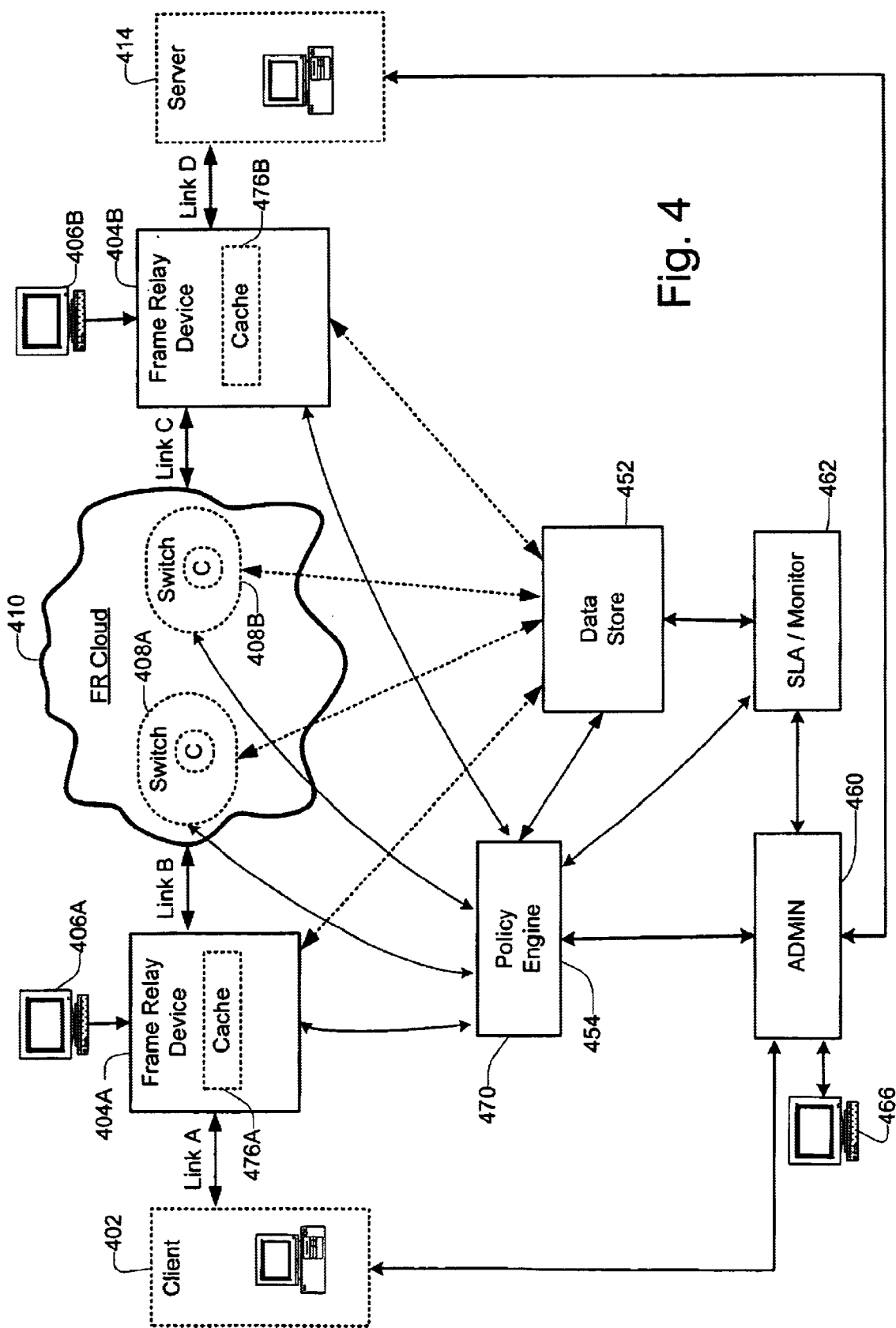
FIG. 4 shows a schematic block diagram of an alternate embodiment of the feedback-based, adaptive data network of the present invention.

FIG. 4 shows an alternate embodiment of the feedback-based adaptive network of the present invention. The network of FIG. 4 utilizes many of the novel concepts described above with respect to FIGS. 2 and 3. However, one difference in the embodiment of the FIG. 4 is that the participating network elements (e.g., 404A, 404B, 408A, 408B) received their respective updated control information directly from the policy engine 454. Thus, for example, in one embodiment, the policy engine 454 directly controls each of the network elements by providing updated control information directly to the network elements. The policy engine may cache the updated control information into a local data cache (e.g. 276A) at a network element. The network element may then retrieve the updated control information from its local cache and reconfigure itself using the retrieved updated control information. Alternatively, the policy engine may send a notification signal to selected network elements, advising each element that updated control information is available for that respective element. The network element may then retrieve the appropriate updated control information from the policy engine 454.

FIGS. 6–10 illustrate examples of flow diagrams relating to various procedures associated with the adaptive feedback-based network illustrated in FIG. 2 of the drawings.

Figure 6:
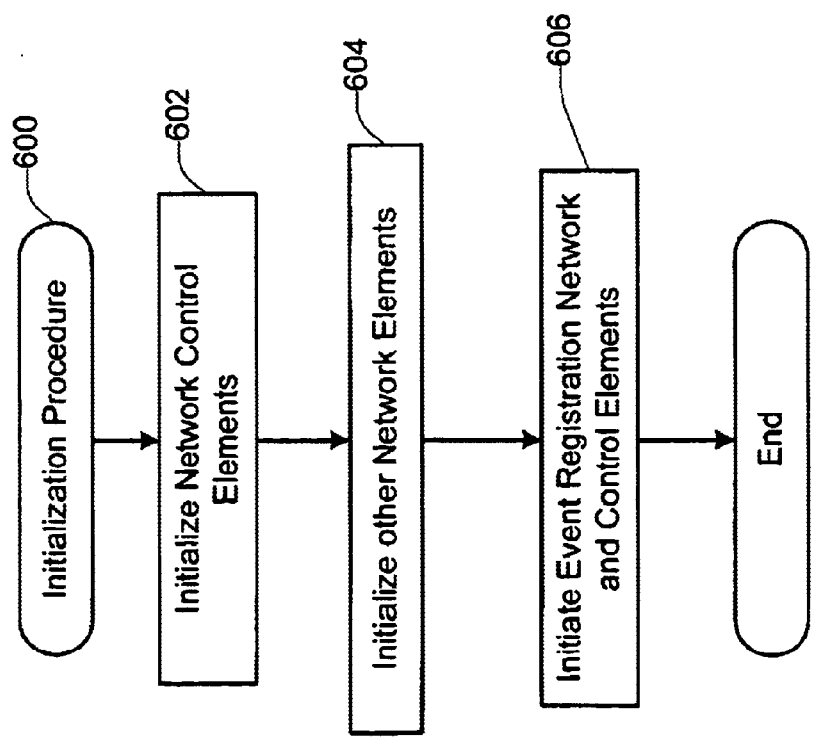
FIG. 6 shows an example of a flow diagram of an initialization procedure for initializing the network of FIG. 2.

FIG. 6 shows a specific embodiment of a flow diagram for an initialization procedure 600 of the present invention. The initialization procedure 600 may commence by initializing the various network control elements (602). As stated previously, the term "control element" refers to the additional hardware and/or software control components for implementing dynamic feedback control of a conventional network, which may include, for example, event server 270, policy engine 254, ADMIN system 260, monitor system 262, data store 252, etc. Additionally, the term "network element" refers to any hardware or software component of the adaptive feedback-based network of the present invention, including the control elements. At 604, the remaining (i.e. non-control) elements of the network are initialized. In a specific embodiment, each element may be initialized using existing control parameters which reside in a local cache (e.g., 276A) or a configuration file (not shown) residing at the network element. Event registration is then initiated (606) for the various network elements (including network control elements) via the event handler associated with each element. The event registration procedure is described in greater detail with respect to FIG. 7.

Figure 7:
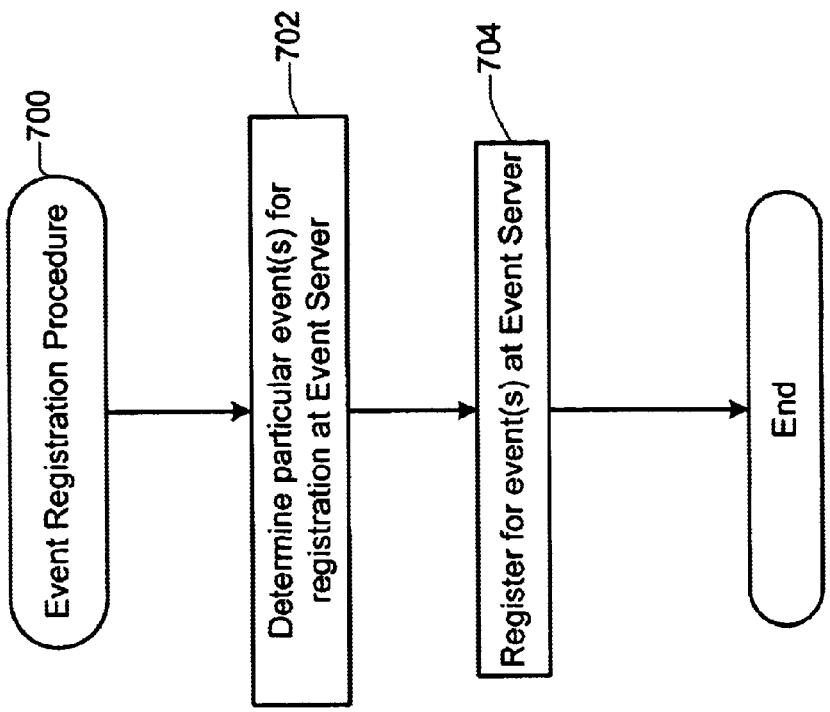
FIG. 7 shows a flow diagram of an event registration procedure 700 in accordance with a specific embodiment of the present invention.

FIG. 7 shows a flow diagram of an event registration procedure 700 in accordance with a specific embodiment of the present invention. Event registration for a particular network element may be implemented via its associated event handler. In the example of FIG. 7, it is assumed that the event registration procedure 700 is being implemented at network element 204A of FIG. 2.

According to a specific embodiment, the event handler 274A may initially consult a local configuration file (not shown) in order to determine which events the network element is to register for at the event server 270. The configuration file may be programmed using a command line interface terminal 206A. Alternatively, the event handler may be statically pre-configured to automatically register for specified events upon initialization. Thus, at 702, the event handler 274A determines the particular events for which network element 204A is to be registered at the event server 270. Thereafter, the event handler 274A registers (704) network element 204A for notification of selected events, for example, by attaching to selected event channels at event server 270. As described previously, in a specific embodiment the event notification service is implemented utilizing a standardized CORBA event service API, commonly known to those skilled in the art. After the network element has registered with the event server for event notification, the network element is then ready to receive and react to event notification messages. Additionally the network element is able to report event occurrences (e.g. errors detected by the network element) to the event server 270, where other network elements have registered to be notified of such events.

Figure 8:
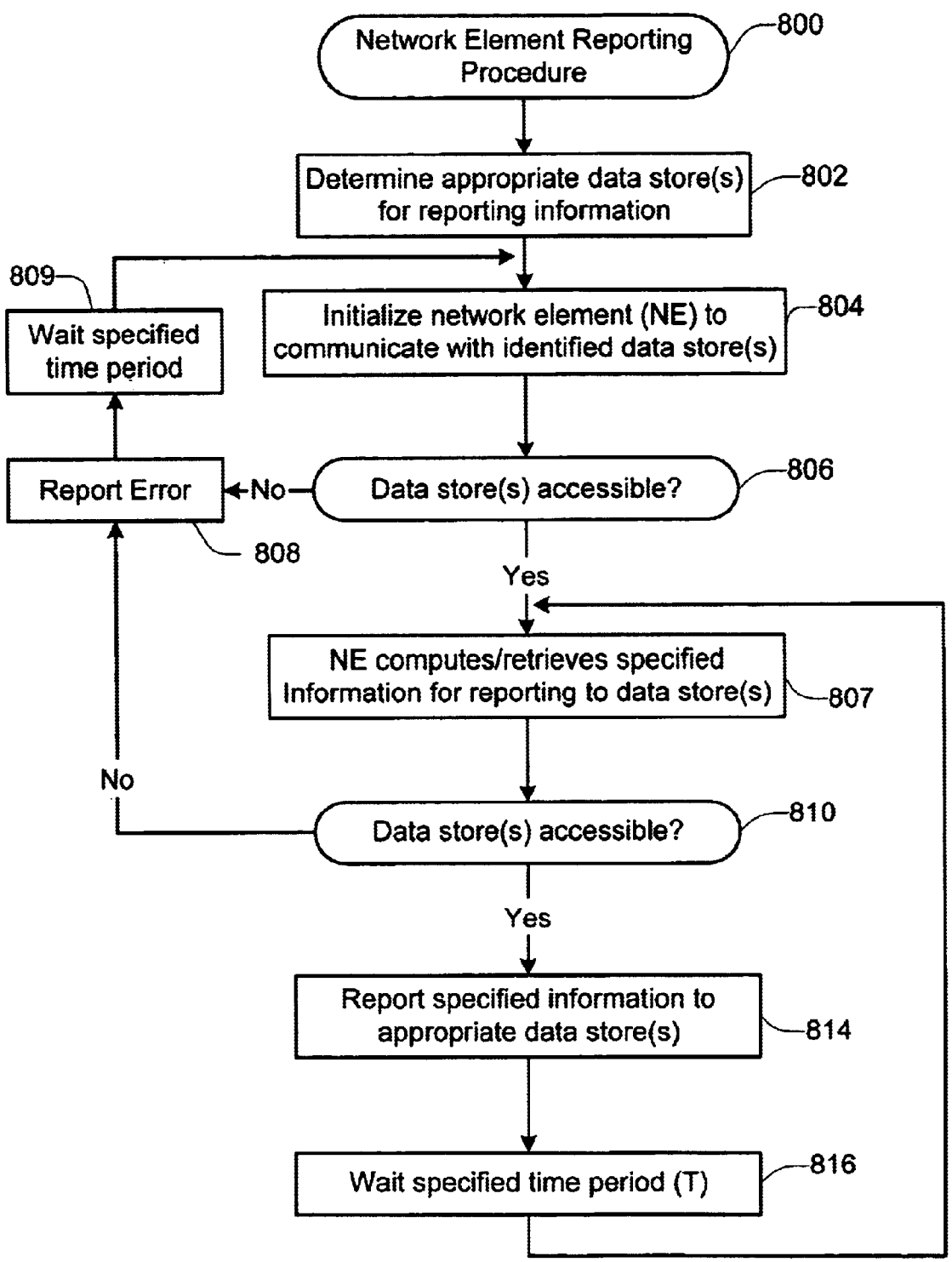
FIG. 8 shows a flow diagram of a network element reporting procedure 800 in accordance with a specific embodiment of the present invention.

FIG. 8 shows a flow diagram of a network element reporting procedure 800 in accordance with a specific embodiment of the present invention. The network element reporting procedure may be initiated, for example, during initialization of the network element. As described in greater detail below, the network element reporting procedure 800 is executed at the network element and provides a technique for causing the network element to report specified information of the network element to the data store.

When the network element reporting procedure 800 is implemented by a specific network element, the network element first determines (802) the appropriate data store(s) for reporting its operating information. In one embodiment, the network element may determine the appropriate data stores for reporting its operating information by consulting a configuration file residing at the network element. In a specific embodiment, an automated approach using a multicast mechanism for discovering the appropriate data stores may be implemented via additional software. The automated approach using multicast automates the data store selection process and may therefore be independent of the particular implementation of each data store.

Once the appropriate data store(s) has been identified, the network element is then initialized (804) to communicate with the identified data store(s). In a specific embodiment where the data store is implemented as an LDAP directory service, a network element may be initialized to communicate with the data store utilizing LDAP function calls. The LDAP function calls are part of a standard API library which may be stored at the network element and used for communicating with the LDAP directory server. In at least one embodiment of the present invention, the initialization of the network element to communicate with a data store includes performing a log-on procedure so that the network element is logged onto the specified data store(s). If the network element is unable to access (806) the identified data store, it will report (808) the error to event server 270, wait (809) a specified time period (e.g. 0–30 minutes), and then reattempt to communicate (804) with the identified data store(s).

Once a communication link has been established between the network element and the identified data store(s), the network element computes and/or retrieves (807) specific information for reporting to the identified data store(s). For example, as shown in FIG. 3 various frame relay virtual circuit parameter values (e.g., CIR, EIR, dropped packets, etc.) associated with network element 304A are obtained and reported to data store 352.

In a specific embodiment, the type of operating information which the network element is to report is specified in a configuration file located at the network element. This configuration file may be dynamically modified using the feedback technique of the present invention in a similar manner by which the control parameters of the network element are dynamically modified. In an alternate embodiment, the network element is hard coded to automatically report specified information to the data store upon initialization. Moreover, it will be appreciated that the technique of the present invention may be used to dynamically modify any file, state, parameter, etc. of any network element in the network.

After the specified operating information has been retrieved and/or computed by the network element, the network element attempts to access (810) the identified data store(s) for reporting the information. If any one of the data stores is inaccessible, the network element reports the error (808) to the event server 270 via its respective event handler, and wait (809) a specified time period (e.g. 0–30 minutes) before re-attempting to access the data store. It is to be noted that the network element reporting procedure 800 may be implemented as a multi-thread process whereby each thread is used to report network element operating information to a respective data store, or whereby each thread is used to report a specific portion of operating information to a specified data store. Alternatively, the network element reporting procedure 800 may be implemented as multiple processes or as a single threaded process with multiple concurrent runtime instances. If one data store is inaccessible while another data store is accessible by the network element, each runtime instance or thread of procedure 800 may take different action as appropriate.

If the network element is able to access a specified data store, the network element reports (814) its data or operating information to that data store, whereupon the information is stored at the data store. In the specific embodiment where the data store is implemented as an LDAP server, updated operating information provided by the network element may be stored in the data store by using an LDAP library call.

The network element then waits (816) a specified time period before re-computing and/or retrieving updated operating information to be reported to the data store(s). For example, in a specific embodiment of the present invention, the specified time period T (which may be referred to as a polling interval) may range from 0–30 minutes. However, it will be appreciated that the length of the polling interval may vary greatly and may be appropriately determined based upon the particular network in which the technique of the present invention is implemented.

In at least one embodiment of the present invention, the network element continually reports updated operating information to the data store 252. In the event where the network element is unable to access the data store, the error will be reported to the event server which, in turn, will notify the appropriate control elements of the error so that the control elements may take appropriate action.

Event Notification Service

According to a specific embodiment of the present invention, the adaptive network relies on a policy engine that uses real-time network data (e.g. state data) to make policy decisions for generating updated network control parameters to thereby effect changes in the network. Where the network data to be analyzed is obtained from the data store, it is important that the data in the data store be up-to-date at all times. In order for the data to be up-to-date, a notification scheme is provided both from the network element(s) to the data store, and from the data store to the network element(s).

As illustrated in FIG. 2, at least a portion of the network elements include an associated event handling entity or event handler which communicates with event server 270. The event handler may be implement via software, hardware, or a hybrid combination of software and hardware and is configured to function as both an event notification receiving entity and an event notification supplying entity for its associated network element (host device). More specifically, the event handler enables its host device to receive event notification messages relating to the occurrence of one or more events for which the host device has registered to receive notification. Additionally, the event handler is able to provide notification of events related to its host device to the event server. The event server may then broadcast notice of the event to other event handling entities which have subscribed or registered to receive event notification messages relating to that particular event type. When an event notification message is distributed to any one of the network or control elements, it is received by the respective event handler of that element. In a specific embodiment, event notification service may be implemented utilizing an asynchronous notification scheme.

Thus, for example, event handler 272 which is associated with data store 252 may monitor the availability of updated control information at data store 252, and notify the event server 270 of the availability of such data as it becomes available. The event server 270 may then send event notification messages to selected network elements which have registered to receive event notification relating to the particular updated control information which has become available at data store 252. Using network element 204A as an example, the event notification message dispatched by event server 270 will be received by event handler 274A. In a specific embodiment, the event handler queues and processes each received event notification message. During processing of the event notification message, the event handler notifies the network element 204A of the event occurrence, whereupon the network element may then take appropriate action. In this way, the event handler 274A serves as an event notification receiving device.

In addition to serving as an event notification receiving device, the event handler 274A may also function as an event notification supplying device to the event server 270. For example, if the communication link between the network element 204A and data store 252 is down, the event handler 274A may send a message to the event server stating that network element 204A is unable to communicate with data store 252. This message may, in turn, be distributed to various other components of the system or network which have subscribed to receive notification of this type of event occurrence. For example, ADMIN system 260 may be notified in order to inform a network administrator of the problem. Additionally, where appropriate, the ADMIN system 260 may also inform users 202 and/or user 214 of the problem. Further, the event server may also notify the policy engine 254 and monitor device 262 of the problem. One reason for informing policy engine 254 and monitor device 262 of this type of problem is to prevent these systems from using erroneous data at data store 252 to perform feedback control of the various network elements. Thus, for example, if network element 204A is unable to report its current information to data store 252, the policy engine 254 should preferably be notified in order to prevent it from using erroneous or out-dated data (relating to network element 204A) in calculating new control information for the network elements. The same reasoning also applies to monitor device 262. If the information within the data store is not current or up to date, it is desirable that the policy engine and monitor device be notified in order to prevent these devices from using the outdated or non-current data to dynamically perform feedback control of various network parameters.

In a specific embodiment of the present invention, each network element which is configured to receive event notification messages uses an event notification response procedure for receiving and reacting to the event notification message. The event notification response procedure may be configured as a multi-thread process which is described, for example, in FIGS. 9A and 9B of the drawings. Alternatively, the event notification response procedure may be implemented as multiple processes or as a single threaded process with multiple concurrent runtime instances.

Figure 9A:
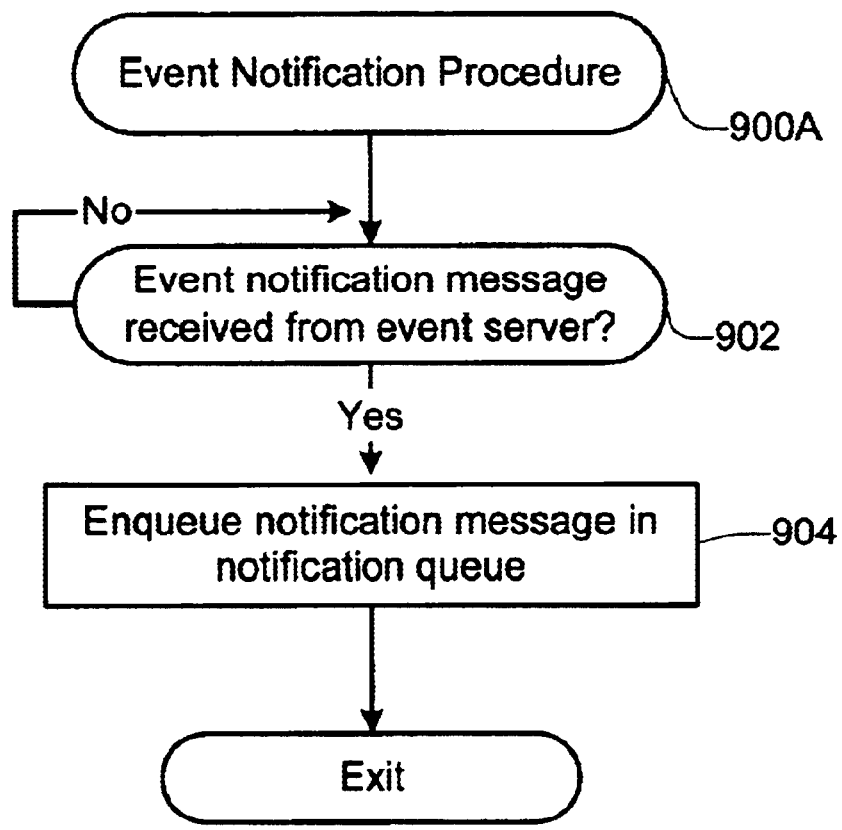
FIG. 9A shows a flow diagram of an event notification procedure 900A in accordance with a specific embodiment of the present invention.
Figure 9B:
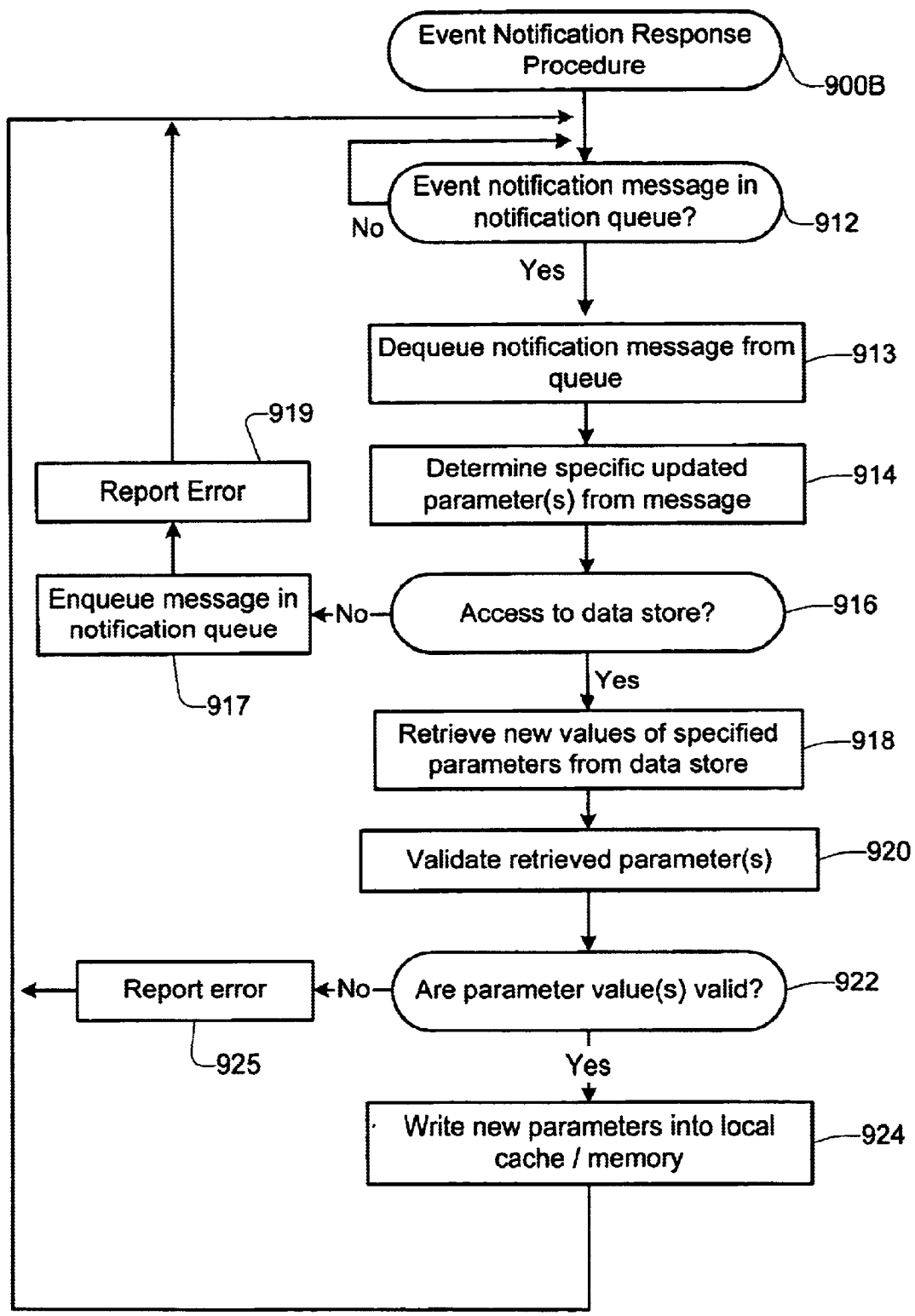
FIG. 9B shows a flow diagram of an event notification response procedure 900B in accordance with a specific embodiment of the present invention.

FIGS. 9A and 9B illustrate a specific embodiment for implementing a multi-thread process of an event notification response procedure. Referring first to the Event Notification Procedure 900A of FIG. 9A, and using network element 204A as an example, event handler 274A continually monitors (902) selected event notification channels at the event server to which that network element has attached. When an event notification message is received (902) at the network element, the event handler then queues (904) the notification message in a notification queue. Although not specifically shown in FIG. 2, each network element which is configured to receive event notification messages includes an event notification queue or other data structure for temporarily storing the event notification messages until that message can be processed FIG. 9B illustrates a specific embodiment of an Event Notification Response Procedure 900B of the present invention. The event notification response procedure 900B is implemented by the network element which works in conjunction with the event handling entity of that element for responding to the event notification message. At 912, the event notification queue is checked for any event notification messages which may have been enqueued during the procedure of 900A. Assuming there is at least one event notification message in the queue, the oldest event notification message is dequeued (913) from the queue and analyzed. Based on the event notification message, specific information relating to the event is determined (914). For example, where the event notification message relates to updated control information being available at data store 252, at 914, the specific control parameters which have been updated are determined from the event notification message.

The network element then attempts to access (916) the data store 252 in order to retrieve the specified updated control information. In the event that the network element is unable to access the data store, the event notification message is enqueued (917) in the message notification queue, and the error is reported (916) to the event server via the network element event handler. Thereafter, flow of the procedure resumes at 912, whereupon another attempt is made to fully respond to the event notification message. In a specific embodiment, any event notification messages which have been re-queued (because, for example, they were not able to be fully processed) are processed ahead of other event notification messages in the queue. For example, in a specific implementation, the event notification messages are enqueued in order according to each message's respective arrival time at the network element.

It is to be noted that the error reported to the event server 270 (relating to the network element not being able to access the data store) is forwarded for broadcast to any network elements which have registered to receive notification of such events. For example, the error may be reported to the administration system 260 in order to alert a system administrator of the problem. Additionally, the error may be reported to the policy engine 254 in order to inform the policy engine that network element 204A is no longer reporting current information to the data store. In this way, the policy engine is prevented from generating new control information based upon erroneous or outdated data located at data store 252.

Assuming, however, that the network element is able to access data store 252, at 918 the network element retrieves the specified updated control information from data store 252. Any suitable mechanism may be used to retrieve the new values of the updated control information from the data store. In a specific example where the data store is implemented as an LDAP directory server, an LDAP library call may be used to retrieve the updated control information. Where the data store is implemented as a relational database, an SQL search command may be used for retrieving the updated control information. Alternatively, where the data store is implemented as a file, a read command may be used to retrieve the control information. Where the data store is accessible using a simple network management protocol (SNMP), a get-parameter command may be used for retrieving the updated control information.

Once the updated control information has been retrieved from the data store, the data is validated (920) as a safety precaution in order to ensure that the updated control parameter values are within an allowable range or boundary specific to that particular network element. In a specific embodiment, the predetermined range or boundary criteria may be stored, for example, in a configuration file residing at the network element. In an alternate embodiment, the updated parameter data retrieved from the data store is dynamically validated based upon a platform evaluation performed by the network element. For example, the network element may execute a procedure for dynamically determining upper and lower bounds for a respective control parameters based upon its current operating condition and/or performance. The upper and lower bounds for these parameters may then be used to validate the control information retrieved from the data store. If the retrieved values from the data store are determined to be invalid, the network element may simply ignore the updated parameter data and continue to behave using its current control parameter information. Additionally, where the values in the data store are determined to be invalid, the network element may report the error or problem to the event server 270, which may then forward the error information to other appropriate control elements for logging or responding to the error.

Thus, at 922, a determination is made as to whether the retrieved updated control information is valid based upon the validation preformed at block 920. If the retrieved parameter data is not valid, the values are discarded and an error is reported (925) to the event server 270 for distribution to appropriate network elements. Thereafter, flow control of the procedure 900B resumes at block 912. If, however, it is determined that the retrieved parameter data is valid, at 924 the newly retrieved control information is written in to the local cache or memory 276A of the network element. In a specific implementation, a "cached data" flag or register is set to indicate that new or updated control information exist within the local cache 276A. Thereafter, flow control of the procedure returns to block 912.

In alternate embodiments of the present invention the event response procedure 900B may differ slightly depending upon how the adaptive feedback-based network of the present invention is implemented. For example, in a specific alternate embodiment, the actual values relating to the updated control information are passed in the event notification message to the corresponding network element. Thus, in this embodiment, the actual values relating to the updated control information may be determined directly from the event notification message upon dequeuing the message from the notification queue. Accordingly, the network element need not retrieve the updated control information from the data store.

After new or updated control information has been cached into the local cache of a respective network element, a network element parameter update procedure is used to configure or reconfigure the network element using the updated control information cached within the local cache.

Figure 10:
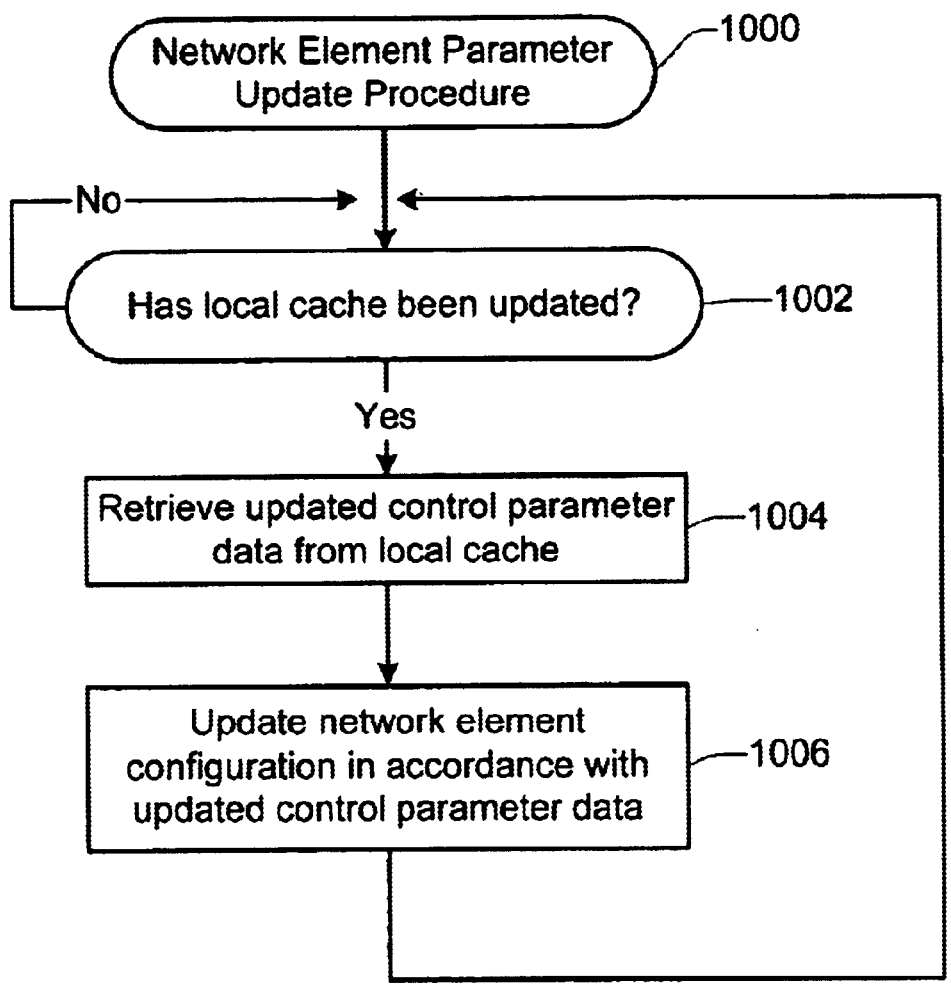
FIG. 10 shows a flow diagram of a network element parameter update procedure 1000 in accordance with a specific embodiment of the present invention.

FIG. 10 shows a network element parameter update procedure 1000 in accordance with a specific embodiment of the present invention. Procedure 1000 may be implemented automatically by the network element upon determining that updated control information is available in its local cache. Initially, at 1002, the procedure waits until it is notified that new data has been cached into the local cache. In a specific embodiment this is implemented via a "cached data" register or flag. However, it will be appreciated by those having ordinary skill in the art that there are a variety of conventional techniques for determining whether new data has been cached into the local cache of the network element.

If it is determined that new data has been written in to the local cache 276A, the newly cached data is retrieved (1004). The network element then automatically configures or reconfigures itself (1006) using the cached information. The cached information represents updated control information generated by the policy engine in response to changing network conditions. Typically, when the network element configures itself using the updated control information, its performance and/or operation is affected in some manner. This effect of the performance or operation of the network element will typically be reflected in the new operational information which the network element reports to data store 252. This new information will, in turn, be analyzed by the policy engine 254, which may generate new control information in response to the newly reported information from the network element. In this way, feedback control of the network element is achieved.

After the network element has been reconfigured utilizing the updated control information, the "cached data" flag or other indicator used for indicating new data cached within the local cache 276A may be reset. Thereafter, the process returns to a previous state represented by block 1002.

As described previously, the adaptive feedback-based network of the present invention includes an event notification service which is implemented via event server 270 and the plurality of event handlers associated with the network and control elements. Event server 270 (FIG. 2) may be implemented as a separate device having at least one CPU and memory, or, alternatively, can be implemented as an application to run on top of the operating system of another device in the network. One responsibility of the event server is to manage the plurality of event channels which are used by the various event handling entities to transmit and receive event notification messages. When an event handler detects an occurrence of an event, the event handler reports the event to the event server 270 which, in turn, broadcasts an event notification message to selected network elements using a specific event channel. In a specific embodiment of the present invention, the event notification service is implemented using standardized CORBA event service APIs.

Figure 15:
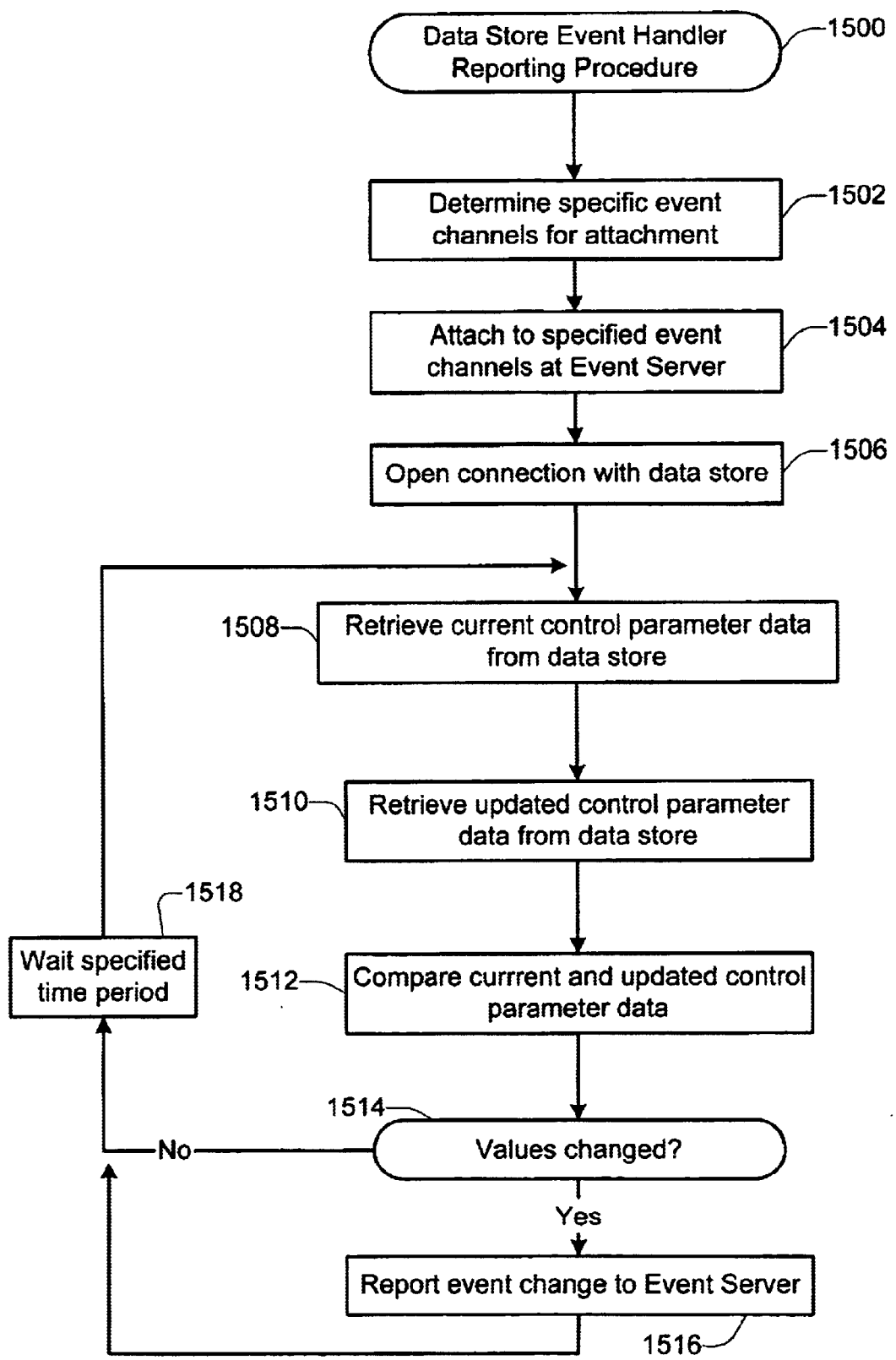
FIG. 15 shows an example of a flow diagram for implementing a data store event handler reporting procedure 1500, which may be implemented by data store 252 of FIG. 2.

FIG. 15 shows an example of a flow diagram for a data store event handler reporting procedure 1500, in accordance with a specific embodiment of the present invention. Procedure 1500 may be implemented via the event handling entity 272 residing at data store 252. One responsibility of event handler 272 is to continually monitor the data store for new or updated control information which has been generated by the network elements or by the policy engine 254. When event handler 272 detects the occurrence or availability of a new control parameter, it notifies the event server 270 which distributes the event notification message onto the appropriate network element(s). In a specific embodiment, event handler 272 may be implemented as a process with multiple threads. Each thread may be responsible for monitoring and reporting a specific event occurring at data store 252. Alternatively, event handler 272 may be implemented as a single threaded process which allows for multiple runtime instances to be running concurrently. For example, one thread or runtime instance of event handler 272 may continually monitor the data store for updated CIR data associated with a first subset of network elements in the network. A different thread or runtime instance of event handler 272 may continually monitor the data store for updated EIR parameters associated with a second subset of network elements. Thus, it will be appreciated that the data store event handler reporting procedure 1500 describes a monitoring and reporting technique which may be implemented by one of the multiple threads or run-time instances of event handler 272.

Referring to FIG. 15, upon initialization of the event handler 272, or at some point thereafter, the event handler determines (1502) the particular event(s) to be monitored for reporting to event server 270. In a specific embodiment, this information may be determined by consulting a configuration file associated with data store 252. Alternatively, the event handler may be hard coded to automatically monitor specified events upon initialization. Additionally, once the specific event(s) to be monitored have been identified, the event handler determines the associated event channel(s) for attachment (to the event server) relating to the identified event(s) to be monitored.

Once the event handler has determined the specific event channels for attachment, it attaches (1504) to the specified event channels at event server 270. In a specific embodiment, the event handler may attach itself to the specified event channels at the event server using standardized CORBA APIs. Thereafter, at 1506, the event handler procedure opens a connection with the data store 252. In a specific embodiment, the connection with the data store is established using a Java naming and directory interface (JNDI).

After a connection with the data store has been established, the event handler is then able to retrieve specific data from the data store in order to determine whether the specified data has been updated by the policy engine. In a specific embodiment, the particular data retrieved by the event handler is specified in the event handler programming instructions. In the example of FIG. 15, it is assumed that the event handler is responsible for reporting updated control information stored within data store 252. Accordingly, the event handler will retrieve (1508) the current control parameter values reported by the various network elements to the data store, and will also retrieve (1510) the desired or updated control parameter values generated by the policy engine. For example, where the specific event relates to updated CIR values for the frame relay circuit associated with network element 204A (FIG. 2), the event handler will retrieve the current CIR value reported from network element 204A to the data store, and will also retrieve the desired CIR value for the frame relay circuit associated with element 204A generated by the policy engine. At 1512, the current and desired control parameter values are compared in order to determine (1514) if the values have changed or have been modified by the policy engine.

If it is determined that there is no change between the current and desired values of the specific control parameter being analyzed, the procedure waits (1518) a specified time period (e.g., 0–30 minutes) before repeating the analysis, starting at block 1508. In an alternate embodiment, this wait cycle may be replaced by another event service routine.

If, however, it is determined that the current control parameter value reported from the network element differs from the desired control parameter values generated by the policy engine, the event handler will generate (1516) an event message. In a specific embodiment, this event change message may be forwarded to the event server 270 for distribution to other network elements. Thereafter, the event handler will wait a specified time period before repeating procedure 1500 starting at block 1508.

Monitor System and ADMIN system

As described previously, at least one embodiment of the adaptive feedback-based network of the present invention includes a monitor system (262, FIG. 2). As described in greater detail below, monitor system 262 may be configured to serve a variety of purposes, and therefore may be referred to by different names, depending upon the particular function it is performing. Like the policy engine, the monitor system 262 may be implemented as a separate machine having memory, an operating system (e.g. Windows NT, UNIX, LINUX, DOS, etc.), and at least one CPU. Alternatively, monitor system 262 may be implemented on top of the operating system of another one of the network elements (including the control elements). In this latter embodiment, it is possible for the monitor system to share the event handler device associated with that network element. In a specific embodiment, the monitor system 262 may be implemented in Java, and run on one of the above-described platforms. Additionally monitor system 262 may include a plurality of business application plug-ins for analyzing various aspects of network performance or other network characteristics.

In a specific embodiment, monitor system 262 utilizes the policy engine 254 for running the plurality of plug-in applications associated with the monitor system. Thus, according to one embodiment (not shown), monitor system 262 may be configured to run on top of the policy engine 254. In this embodiment, the monitor system may not include a separate event handler device, but instead may use the event handler device associated with the policy engine.

Each of the business application plug-ins utilized by the monitor system 262 may be used to evaluate a specific set of characteristics of the network. For example, monitor system 262 may be used to evaluate performance criteria of the various network elements to determine whether the service quality provided by the service provider conforms with the standards set forth in a Service Level Agreement (SLA) established between the service provider and the end user or consumer. Alternatively, using different plug-in applications, monitor system 262 may be used for performance monitoring, billing, configuration management, security violation reporting, fault management, etc. Moreover, different plug-in applications may run concurrently to allow monitor system 262 to analyze different aspects of the network simultaneously.

Figure 13:
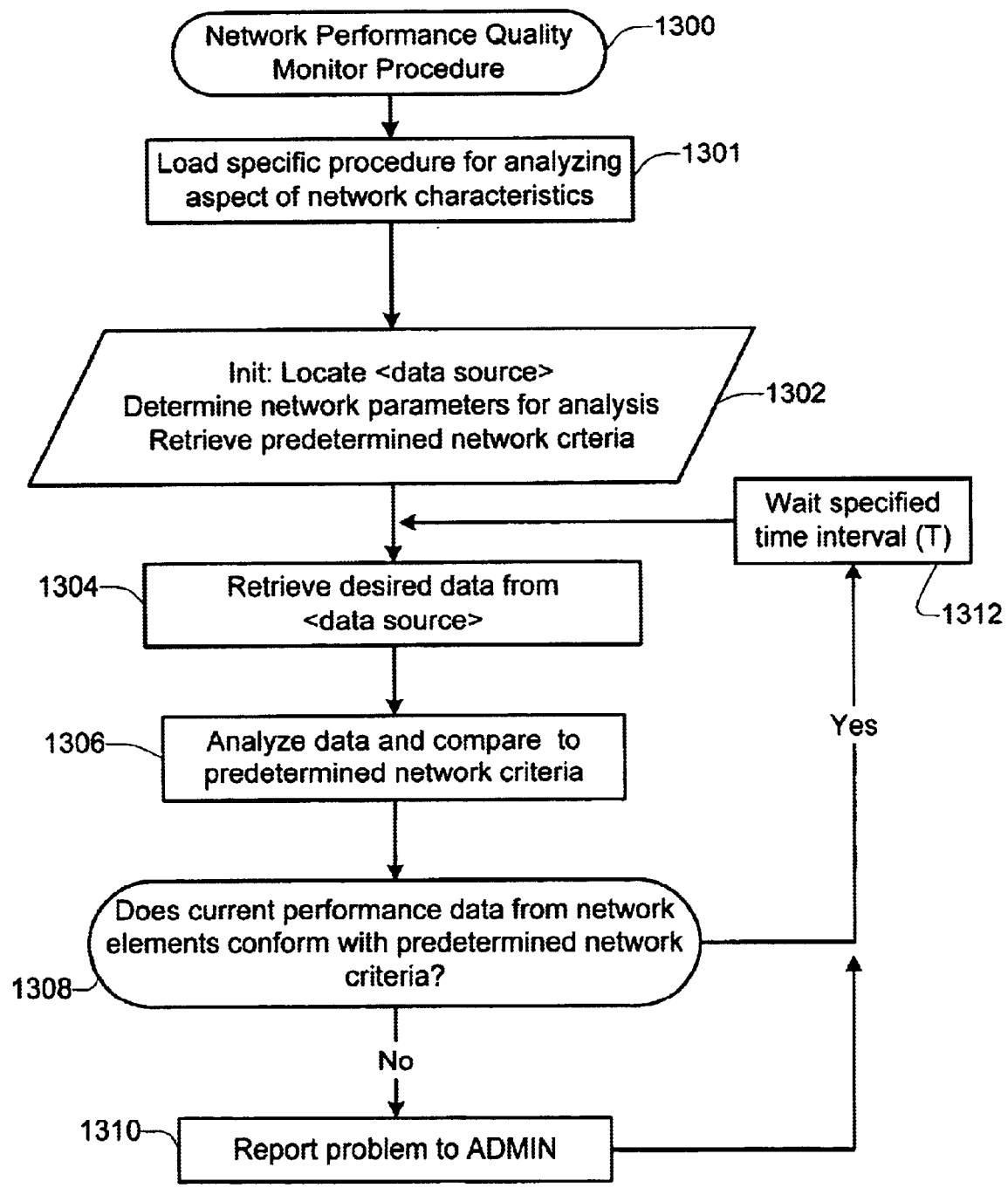
FIG. 13 shows a specific embodiment of a flow diagram for implementing a network performance quality monitor procedure 1300, which may be implemented by monitor system 262 of FIG. 2.

FIG. 13 shows a flow diagram of a network performance quality monitor procedure 1300 in accordance with a specific embodiment of the present invention. According to one embodiment, the network performance quality monitor procedure is a multi-thread process which is implemented by the monitor system 262. Alternatively, the network performance quality monitor procedure may be implemented as a single threaded process which allows for multiple runtime instances of the process to be running concurrently. Accordingly, a variety of different network characteristics may be analyzed concurrently by the monitor system 262. For each thread or runtime instance of the monitoring procedure 1300, a specific procedure or business application plug-in for analyzing an aspect of network characteristics is loaded (1301) for execution. At 1302, various initialization procedures are performed, which may include locating and attaching to a "data source" for retrieving data which is to be analyzed, determining the specific network parameters which are to be analyzed, retrieving predetermined network criteria, etc. The initialization information may be obtained, for example, by consulting a configuration file associated with the particular business application plug-in which is loaded. Alternatively, the initialization may be included within the program instructions of the loaded plug-in application. For example, in a specific embodiment, the data source for retrieving the network parameter information to be analyzed is the data store which may be accessed, for example, using a directory access protocol. The specific information to be analyzed from the data store may include, for example, reported CIR and EIR values from each of the links A, B, C, D, (FIG. 2). The predetermined network criteria may include, for example, specific CIR and EIR values derived from the Service Level Agreement.

In a specific embodiment, the network quality monitor system 262 includes functionality to gather information from the data store and functionality to perform quality metrics calculation process. Block 1304 describes the network statistics gathering functionality. Basically, network statistics or other characteristics are gathered or retrieved from one or more data sources. It is to be noted that the data source may include any network element or control device within the network. In a specific embodiment, the network statistics are retrieved from the data store.

The quality metrics calculation functionality is described in block 1306. The network statistics or other characteristics which have been retrieved from the data store are then compared against pre-established criteria to determine (1308) if the current network quality (relating to the particular aspect of the network being analyzed) is within the acceptable bounds as established by the predetermined criteria.

If it is determined that the currently analyzed network statistics are within the acceptable bounds as defined by the predetermined network criteria, the monitor procedure 1300 waits (1312) a specified time interval (e.g., 0–30 minutes) before repeating the analysis starting at block 1304. If, however, it is determined that the current network statistics do not meet the specified predetermined criteria, the problem is reported (1310) to the ADMIN system 260 for handling. Thereafter, the monitor procedure 1300 waits (1312) a specified time interval before repeating the analysis, starting at block 1304. Further examples of the network quality monitor procedures which may be run by monitor system 262 are provided in the descriptions of FIGS. 16–18.

Monitor system 262 and ADMIN system 260 work together to provide administrative functionality to the adaptive feedback-based network of the present invention. Additionally, the administration system 260 provides an external interface to remote users, (e.g., users 202, 214, FIG. 2). Using the ADMIN system 260, a remote user is provided with the ability to perform configuration and manipulation of the logical elements within the network. The ADMIN system 260 may be implemented as a separate machine having memory, an operating system (e.g. Windows NT, UNIX, LINUX, DOS, etc.), and at least one CPU. Alternatively, ADMIN system 262 may be implemented on top of the operating system of another one of the network elements (including the control elements).

Figure 14:
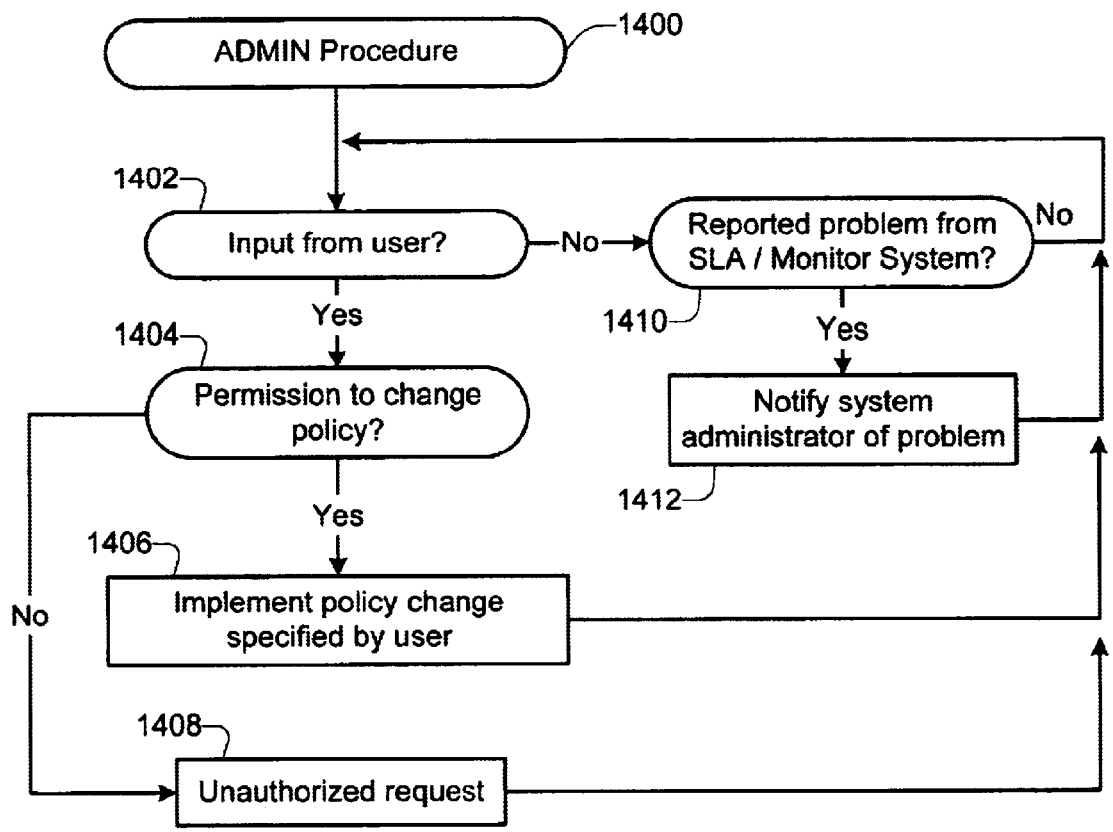
FIG. 14 shows a specific embodiment of a flow diagram for implementing an administration procedure 1400, which may be implemented by ADMIN system 260 of FIG. 2.

FIG. 14 shows a flow diagram of an admin procedure 1400 in accordance with a specific embodiment of the present invention. The admin procedure 1400 is implemented by ADMIN system 260, and may be implemented as a multi-thread process. Alternatively, the admin procedure 1400 may be implemented as a single threaded process which allows for multiple runtime instances of the process to be running concurrently. As described previously, the ADMIN system 260 may be used to dynamically modify specific policies within the policy engine 254.

In one embodiment of the present invention, policies in the control of WAN services are essentially treated as static entities. However, in alternate embodiments, a mechanism is provided for allowing these policies to adapt to changing network conditions in order to enable the network to adapt to changing network conditions. Networks that adapt to changing conditions are very advantageous in fulfilling Service Level Agreements (SLA) in WAN networks. Moreover, a dynamic, policy-enabled, adaptive network can be a self-healing, maintenance-free network.

In a specific embodiment, there are at least three techniques for achieving modification of a policy within the policy engine 254. A first technique is for a remote user to dynamically modify the policy via ADMIN system 260. A second technique is for a system administrator to modify the policy via local terminal 266. A third technique to enable the ADMIN system 260 to automatically and dynamically modify a policy within the policy engine using artificial intelligence and/or fuzzy logic to determine the specific policy modifications. The admin procedure 1400 of FIG. 14 provides an example of how these various techniques are implemented at the ADMIN system 260.

In the specific embodiment of the FIG. 14, admin procedure 1400 is responsive to either a input from a user (1402) or an input from the monitor system 262 for modifying a policy within the policy engine 254. If input is received from a user, it will be assumed (for purposes of this example) that the user has provided a request to make a specific policy modification, and has included the specific policy modifications to be performed along with the request. In this example, a user may be user 202 of FIG. 2, or may be a system administrator accessing ADMIN system via local console 266. At 1404, admin procedure 1400 determines whether the user has permission to modify or change the specified policy. For example, an access list may be consulted to determine if the user has authority to make the proposed policy modification. If it is determined that the user does not have authority to make the proposed modification, at 1408, an unauthorized request message is returned to the user, whereupon the procedure 1400 resumes at block 1402. If, however, the user is authorized to make the proposed policy modification, the specified policy within the policy engine is modified (1406) (e.g. via ADMIN system 260) in accordance with the proposed policy modification specified by the user. Thereafter, admin procedure 1400 resumes at block 1402.

In addition to responding to input from a remote user, admin procedure 1400 is also responsive to input from monitor system 262. Thus, when a reported problem from monitor system 262 is received (1410) at ADMIN system 260, the admin procedure notifies (1412) the system administrator of the reported problem via terminal 266. The system administrator is then able to analyze the problem and make modifications to the policy engine to correct the reported problem.

Illustrative Example

Figure 16:
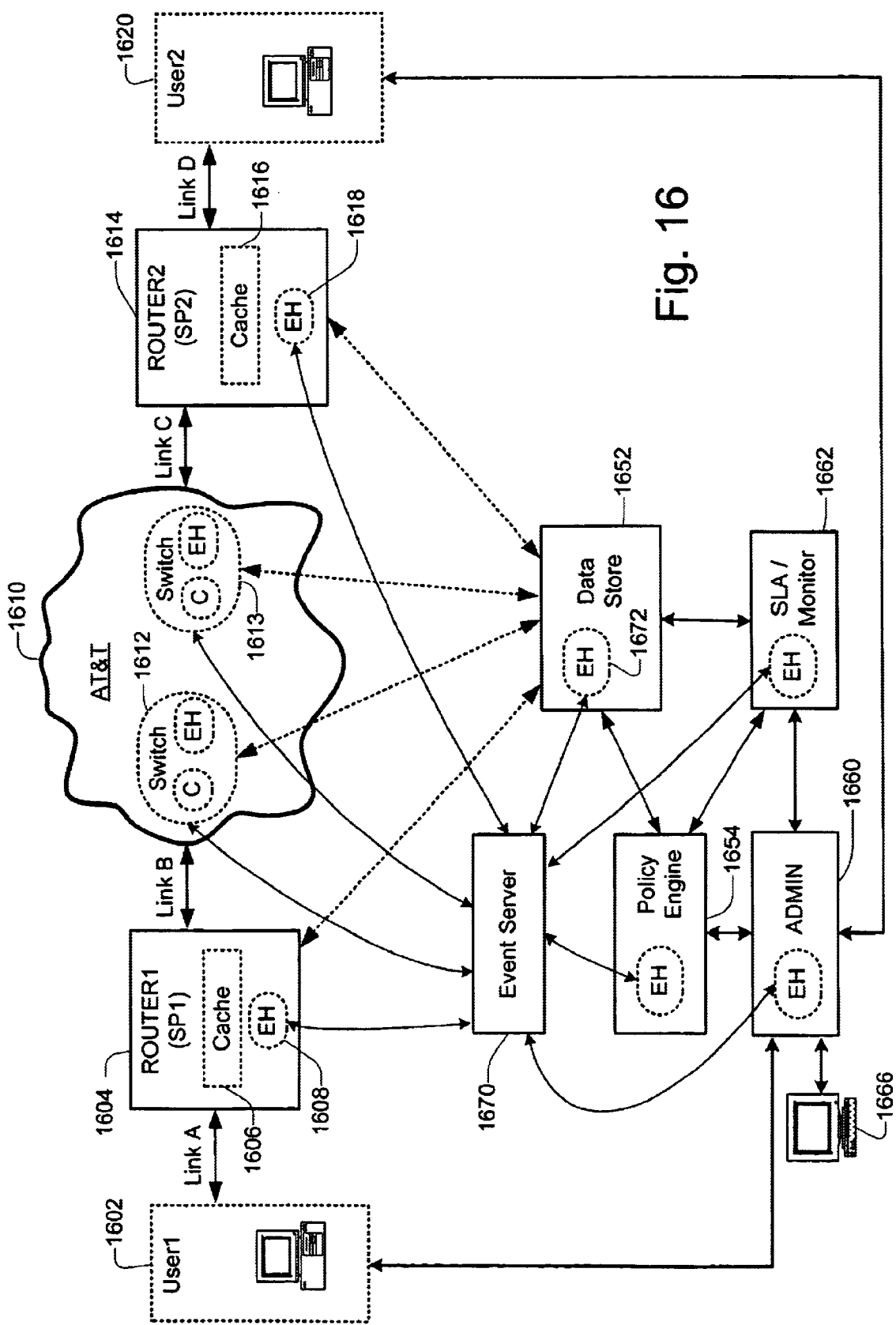
FIGS. 16–18 illustrate schematic diagrams and flow diagrams, showing, by way of example, how the feedback-based adaptive network of the present invention may be implemented in a network for automatically adapting to changes in network conditions.
Figure 17:
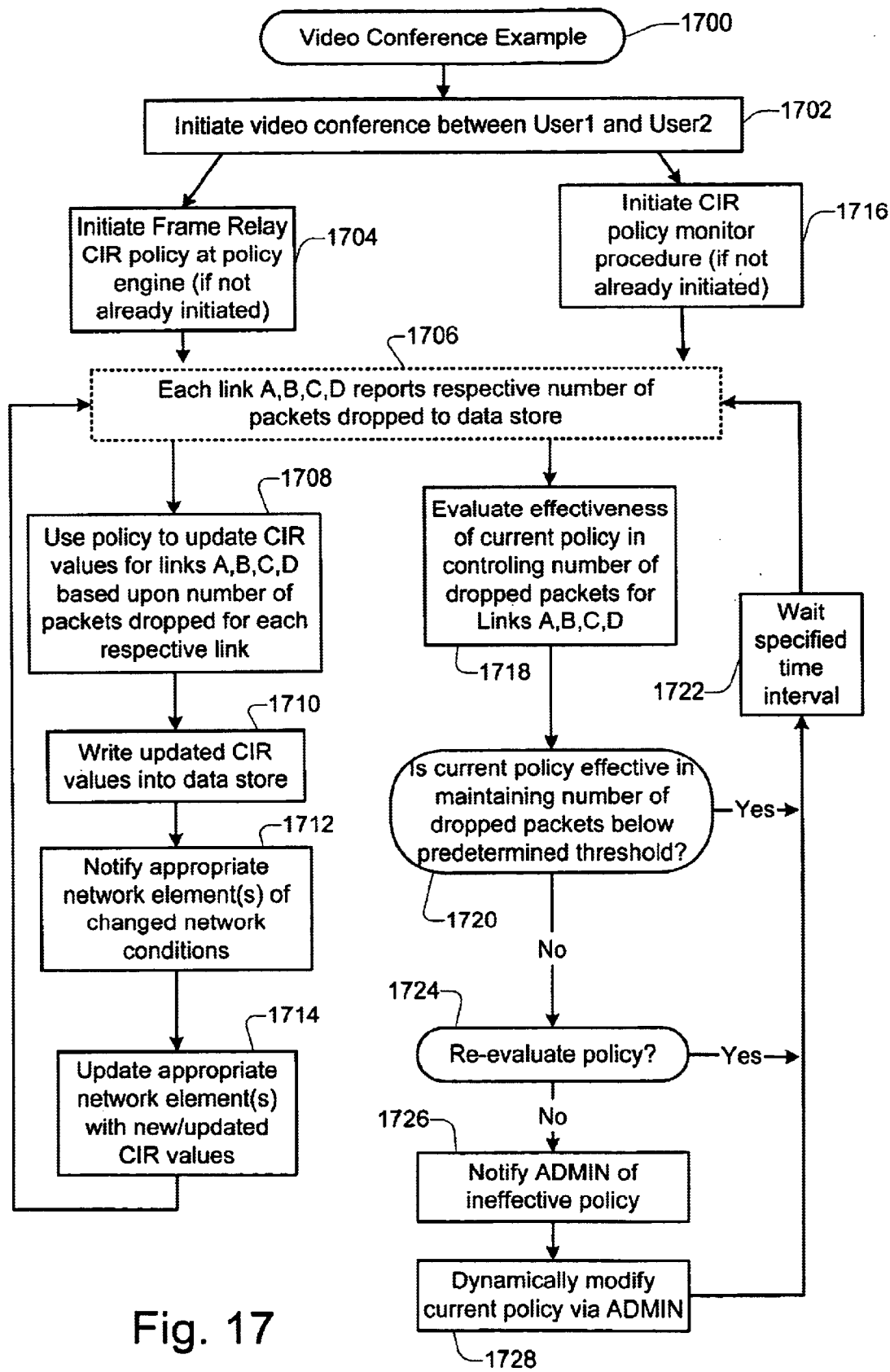
Figure 18:
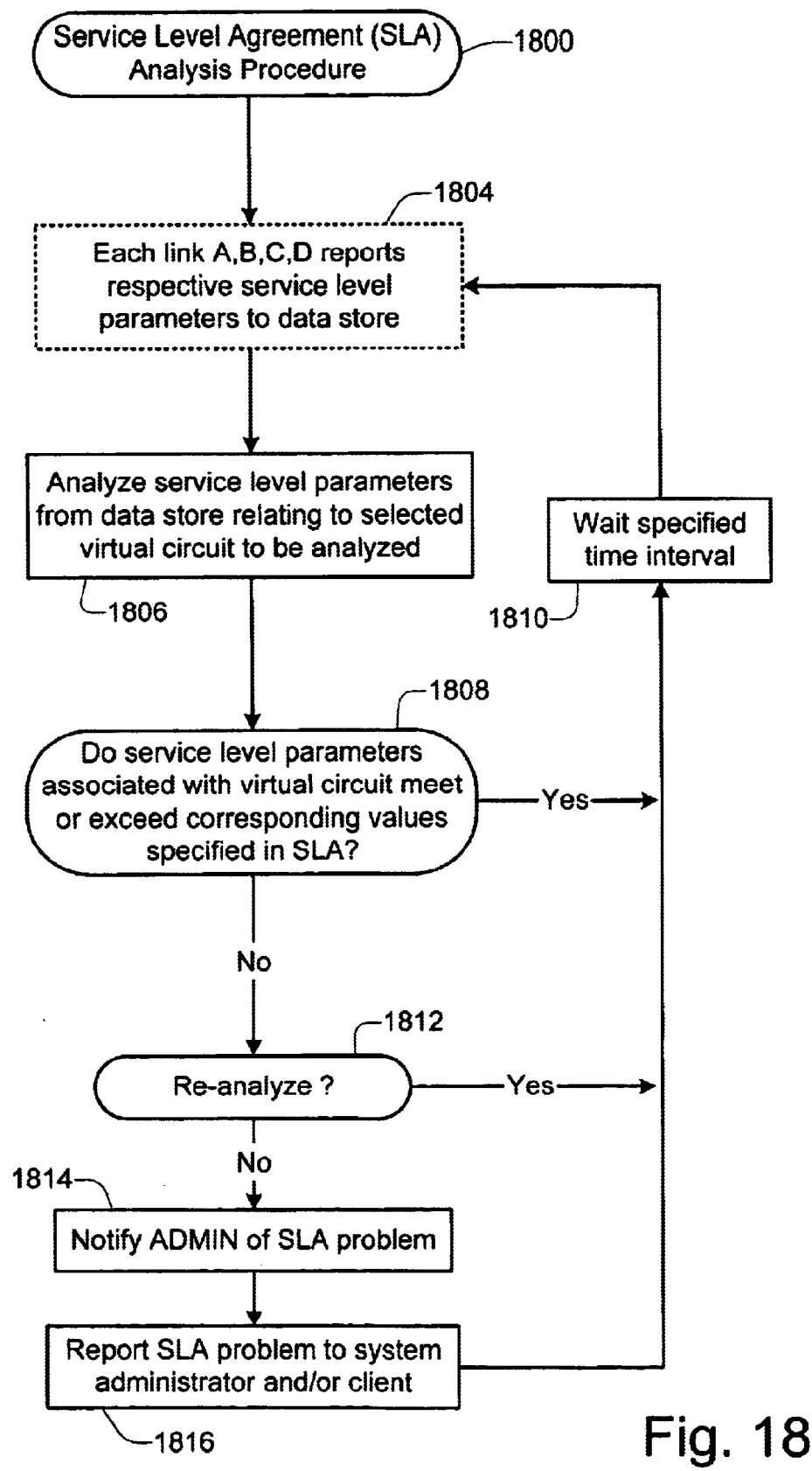

FIGS. 16–18 provide an illustrative example of how the various network elements of FIG. 16 interact with each other to form the feedback-based adaptive network of the present invention.

Referring to FIG. 16, a frame relay virtual circuit is shown connecting user1 (1602) with user2 (1620). User1 communicates with a first router 1604 via link A. In the example of FIG. 16, router 1604 may be managed by a first service provider (SP1). Router 1604 communicates with a frame relay cloud 1612 via link B and switch 1612. The frame relay cloud 1610 is managed and maintained by a service provider such as AT&T. The frame relay cloud 1610 communicates with a second router 1614 via link C and switch 1613. The second router 1614 may be managed by a second service provider (SP2). User 1620 communicates with router 1614 via link D. Using the network illustrated in FIG. 16, various aspects of the present invention will now be described by way of example in which a video conference is established between user1 (1602) and user2 (1620). The video conference example is described in greater detail with respect to FIGS. 17 and 18 of the drawings.

FIG. 17 shows a flow diagram of how the feedback-based network of FIG. 16 adapts to changing conditions in the network as a video conference is initiated between user1 and user2. A video conference application between user1 and user2 is one example of a user application which may require additional bandwidth in order to provide a satisfactory level of quality for using the application to service multiple users across the network. Thus, the video conference example may be abstracted to be applied to any user application requiring additional network resources to provide a satisfactory level of quality for the application to run over a network environment.

As shown in FIG. 17, when a video conference between user1 and user2 is initiated (1702), the network may respond by initiating one or more bandwidth policies at the policy engine 1654, and may also respond by initiating one or more policies/procedures at the monitor system 1662. Thus, at 1704, the frame relay CIR policy is initiated at the policy engine 1654, if this policy has not already been initiated. For example, in a specific embodiment of the present invention, the frame relay CIR policy is loaded at initialization of the policy engine according to instructions contained in a configuration file. Once loaded, this policy may run continuously and concurrently with other polices and/or user applications. In an alternate embodiment, when the user 1602 initiates a video conference with user 1620, this information is passed to ADMIN system 1660. Recognizing that the video conference application may require an increase in allotted bandwidth, ADMIN system 1660 instructs policy engine 1654 to initiate the frame relay CIR policy.

While the frame relay CIR policy is being initiated by the policy engine at 1704, a CIR policy monitor procedure is concurrently initiated (1716) at monitor system 1662, if this procedure has not already been initiated. The monitor system 1662 may load the CIR policy monitor procedure at initialization in accordance with instructions contained in an initialization configuration file related to monitor system 1662. Alternatively, notice of the initiation of the video conference application may be provided by either one of the users to the ADMIN system 1660. The ADMIN system then instructs the monitor system 1662 to load and execute the CIR policy monitor procedure.

One purpose of the frame relay CIR policy (implemented by policy engine 1654) is to monitor the number of packets dropped on selected links in the network, and to adjust or modify the CIR parameter values on these links dynamically and automatically in response to changing network conditions. One purpose of the CIR policy monitor procedure (implemented by monitor system 1662) is to evaluate the effectiveness of the frame relay CIR policy. Thus, both procedures/policies may run concurrently and, if desired, continuously.

At 1706, each of the links A, B, C, D of FIG. 16 reports the number of packets dropped on that link (typically reported as the number of packets dropped during a specified time period) to data store 1652. The frame relay CIR policy at the policy engine 1654 uses this data to generate (1708) updated CIR parameter values for each of the respective links. The updated CIR parameter values generated by the policy engine are then written (1710) into the data store 1652. The event handler 1672 identifies the updated CIR parameter values as new events, and notifies (1712) the appropriate network elements in the network of changed conditions in the network. Notification of the appropriate network elements may be accomplished via the event server 1670, which may broadcast the event notification message relating to the changed network conditions to those network elements which have registered to receive this type of event notification message.

Once the appropriate network elements have been notified of the changed network conditions, each of the appropriate network elements may retrieve its respective updated CIR parameter information from the data store 1652, and may then update (1714) its configuration utilizing the updated CIR parameter information retrieved from the data store. Thus, for example, the CIR values used by the router one (1604, FIG. 16) may be modified using the updated CIR parameter data to increase or decrease data traffic.

Presumably, the updating of the CIR parameter values in each of the selected network elements will affect the number of packets dropped on each of the links associated with these network elements. Thus, after the appropriate network elements have been updated or re-configured utilizing the updated CIR parameter values, the adaptive feedback-control process resumes at block 1706, whereupon each of the links A, B, C, D provides updated information to the data store relating to the respective number of packets dropped at each link. This updated information is then analyzed by the policy engine to generate new CIR parameter values, (if necessary) to be implemented by the appropriate network elements. This adaptive feedback-control process continues until the reported number of packets dropped by each of the respective links conforms with predetermined criteria. When this occurs, the policy engine may still evaluate the number of packets dropped at each respective link, but it will no longer need to generate new CIR parameter values since the current network parameters will reflect that the network has adequately adapted to the current network conditions. In an alternate embodiment, the policy engine still generates the updated CIR parameter values (even if these values are the same as the values reported by the network elements), and writes these values into data store 1652. However, the event handler 1672 recognizes that the current (i.e. reported) CIR values are the same as the desired (i.e. updated) CIR values, and does not notify the network elements of the event. Event notification will be triggered when the event handler 1672 detects a difference between the current and desired CIR values.

In the CIR policy monitor procedure of FIG. 17, the quality monitor system 1662 (FIG. 16) may concurrently and continuously monitor the effectiveness of the frame relay CIR policy implemented by the policy engine. In the example of FIG. 17, the effectiveness of the frame relay CIR policy is measured by analyzing the number of packets dropped at each of the respective links A, B, C. D, and comparing this data to predetermined criteria or guidelines. Thus, for example, at 1718, the reported number of packets dropped for links A, B, C, D are analyzed and compared to a predetermined threshold in order to evaluate the effectiveness of the frame relay CIR policy implemented by the policy engine. A determination is then made (1720) as to whether the frame relay CIR policy is effective in maintaining the number of dropped packets on each or any of the respective links below the predetermined threshold value. If it is determined that the current frame relay CIR policy is effective in maintaining the number of dropped packets on each of the respective links below a predetermined threshold, the quality monitor system 1662 may wait (1722) a specified time interval (e.g., 0–30 minutes) before re-evaluating the effectiveness of the current frame relay CIR policy by analyzing newly updated information relating to the number of packets dropped at each of the respective links.

If, however, it is determined that the current frame relay CIR policy is not effective in maintaining the number of packets dropped at any of the links A, B, C, D below a predetermined threshold, then at 1724, a determination is made as to whether the frame relay CIR policy should be re-evaluated. It may preferable to wait a specified amount of time in order to allow the adaptive feedback process of the present invention to arrive at a steady state. Accordingly, in a specific embodiment of the present invention, the policy implemented by the policy engine may be allowed to execute a number of times before action is taken to modify the policy. For example, the current policy implemented by the policy engine, even if judged ineffective, may be allowed to execute from 0–5 hours before action is taken to modify the policy. Alternatively, the current policy may be re-evaluated if it is determined that the current policy is improving an aspect of the network performance. For example, if the number of reported packets dropped for one or more of the respective links show a reduction compared to that of previous reports, the current frame relay CIR policy may be allowed to continue without modification.

Accordingly, if is determined that the current frame relay CIR policy is to be re-evaluated, monitor system 1662 waits (1722) a specified time interval before re-evaluating the effectiveness of the policy. However, if it is determined that the current frame relay CIR policy is not to be re-evaluated at 1726, the ADMIN system 1660 is notified of the ineffective frame relay CIR policy. Thereafter, at 1728, the frame relay CIR policy may be dynamically modified via ADMIN system 1660. As described previously, the dynamic modification of a policy within the policy engine may be implemented manually by a system administrator via console 1666 or, alternatively, it may be implemented automatically by the ADMIN system using artificial intelligence and/or fuzzy logic. In the current example, the frame relay CIR policy may be dynamically modified by modifying the formula which the policy uses to compute the updated CIR parameter values. An example of how the frame relay CIR policy may be modified is discussed previously, with respect to FIG. 12. Using internal logic, the variable K (taken from the formula provided in the description of FIG. 12) may be incremented by a fixed amount (e.g., 0.1–1.0) if it is detected that the dropped packet count for a respective link exceeds the predetermined threshold value despite the current frame relay CIR policy's attempt to reduce the dropped packet count.

Thus, in a specific embodiment, the policy-based adaptive control technique of the present invention continually tunes at least a subset of network elements in the network. The tuning of a network element may then affect the policy that was used to tune the network device. The modified policy is then used to effect future changes in the network elements. This process repeats itself as the network adapts to changing network conditions.

It will be appreciated that, since the policy engine 1654 and quality monitor 1662 may each be implemented as multi-thread processes or single thread processes with multiple runtime instances, other policies and/or quality monitoring procedures may be running concurrently with the frame relay CIR policy and CIR policy monitor procedure described in FIG. 17. An example of a concurrent quality monitoring procedure implemented by quality monitor system 1662 is shown in FIG. 18 of the drawings.

FIG. 18 shows an example of a flow diagram for a Service Level Agreement (SLA) analysis procedure 1800 which may be implemented by the monitor system 1662 of FIG. 16. One purpose of the SLA analysis procedure is to monitor various aspects of the frame relay virtual circuit (e.g., CIR, EIR, dropped packets, Be, Bc, etc.) to ensure that these parameters fall within specified guidelines set forth in the Service Level Agreement established between the service provider and the user or client. The SLA analysis procedure may be implemented, for example, upon initialization of the monitor system 1662. The specific guidelines or criteria set forth in the Service Level Agreement may be stored, for example, in a configuration file residing at the monitor system 1662. A description of the service level agreement analysis procedure 1800 is provided below using the network example of FIG. 16.

Referring to FIG. 18, at 1804, each of the links A, B, C, D (FIG. 16) reports its respective service level parameter data to data store 1652. In a specific embodiment of the present invention, the service level parameter data is a subset of the state data or other information reported by each of the links to the data store. The reported service level parameters are then analyzed (1806) by the monitor system and compared to values specified by the Service Level Agreement. The corresponding values specified by the Service Level Agreement may be stored, for example, in a configuration file which is associated with the service level agreement analysis procedure 1800.

A determination is then made (1808) as to whether the reported service level parameters associated with the virtual circuit being analyzed meet or exceed the corresponding values or criteria specified by the Service Level Agreement. If it is determined that the reported service level parameters do meet or exceed the corresponding values or standards specified by the Service Level Agreement, the monitor device 1662 waits (1810) a specified time interval (e.g., 0–30 minutes) before reanalyzing the virtual circuit based upon updated service level parameters reported (1804) from the circuit elements.

If, however, it is determined that the reported service level parameters do not meet or conform with the corresponding values or standards specified by the SLA, a determination is then made (1812) as to whether the virtual circuit should be re-analyzed using the service level agreement analysis procedure 1800. There may be a variety of reasons for deciding to repeat a specific analysis procedure at monitor system 1662 before reporting a detected problem to the ADMIN system 1660. For example, it may be desirable to wait a specified time period before reporting an error or modifying a policy in order to allow the feedback-based control network of the present invention to adapt to the changing network conditions and arrive at a steady state. A more detailed discussion of this topic may be found in the discussion relating to block 1724 of FIG. 17. If it is determined that the service level parameters should be reanalyzed, the monitor system 1662 may wait (1810) a specified time interval before repeating the service level agreement analysis procedure using newly updated service level parameter data reported from the virtual circuit elements.

If, however, it is determined that the service level quality of the virtual circuit is not to be re-analyzed, the ADMIN system 1660 is then notified (1814) of the inability of the virtual circuit to conform with the criteria or guidelines specified by the Service Level Agreement. The ADMIN system 1660 may, in turn, report (1816) the SLA problem to a system administrator (via console 1666). Once alerted to the problem, the system administrator may manually reconfigure various network elements in order to rectify the problem. Additionally, the ADMIN system 1660 may also report (1816) the SLA problem to the client (e.g., user 1602, user 1620) so that client may take appropriate action, if desired.

Even after the SLA problem has been reported via ADMIN system 1660 to the system administrator and/or client, the monitor system 1662 may continue to perform SLA quality analysis of the selected virtual circuit by repeating the service level agreement analysis procedure, as described in FIG. 18.

Although several preferred embodiments of this invention have been described in detail herein with reference to the accompanying drawings, it is to be understood that the invention is not limited to these precise embodiments, and at various changes and modifications may be effected therein by one skilled in the art without departing from the scope of spirit of the invention as defined in the appended claims.

What is claimed is:

1. A method for providing dynamic feedback control of network elements in a data network, the data network including a plurality of network elements, each of said network elements having a plurality operating parameters associated therewith, said operating parameters being related to at least one control parameter of said element, said method comprising:

retrieving information related to a first subset of network elements from a first data source;

analyzing at least a portion of said retrieved information based upon selected guidelines to determine whether a performance of at least a portion of said network conforms with predetermined criteria; and automatically sending updated control information to at least one network element based upon said analysis of said information when it is determined that a performance of the at least a portion of the network fails to conform with predetermined criteria;

wherein the portion of retrieved information which is analyzed includes at least one type of information selected from a group comprising:
   committed information rate information;
   excess information rate information;
   committed burst size information;
   excess burst size information;
   network congestion information;
   queue length information relating to selected circuits within the network; and
   dropped packet information.

2. The method of claim 1 wherein the portion of retrieved information which is analyzed includes committed information rate information.

3. The method of claim 1, wherein the updated control information specifies a limit on the operation of at least one network element.

4. The method of claim 3 wherein the portion of retrieved information which is analyzed includes committed information rate information.

5. The method of claim 1 wherein the portion of retrieved information which is analyzed includes excess information rate information.

6. The method of claim 5 further comprising:

receiving an event notification message relating to an error reported by a specific network element; and suspending analysis of information related to said specific network element in response to reception of said error notification message.

7. The method of claim 6 wherein the portion of retrieved information which is analyzed includes excess burst size information.

8. The method of claim 7 wherein the portion of retrieved information which is analyzed includes dropped packet information.

9. The method of claim 1 wherein the portion of retrieved information which is analyzed includes committed burst size information.

10. The method of claim 1 wherein the portion of retrieved information which is analyzed includes excess burst size information.

11. The method of claim 1 wherein the portion of retrieved information which is analyzed includes information relating to queue lengths at selected circuits within the network.

12. The method of claim 1 wherein the portion of retrieved information which is analyzed includes dropped packet information.

13. The method of claim 1 further including automatically updating control parameters of a second subset of network elements in response to said analysis of said portion of retrieved information to thereby affect performance of said network portion.

14. The method of claim 1 further including transmitting said updated control information to a second data source.

15. The method of claim 14 wherein said first data source and said second data source reside within a common device.

16. A computer program product for providing dynamic feedback control of network elements in a data network, the data network including a plurality of network elements, each of said network elements having a plurality operating parameters associated therewith, said operating parameters being related to at least one control parameter of said element, the computer program product comprising:
   at least one computer readable medium;
   computer program instructions stored within the at least one computer readable product configured to:
      retrieve information related to a first subset of network elements from a first data source;
      analyze at least a portion of said retrieved information based upon selected guidelines to determine whether a performance of at least a portion of said network conforms with predetermined criteria; and
      automatically send updated control information to at least one network element based upon said analysis of said information when it is determined that a performance of the at least a portion of the network fails to conform with predetermined criteria;
   wherein the portion of retrieved information which is analyzed includes at least one type of information selected from a group comprising:
      committed information rate information;
      excess information rate information;
      committed burst size information;
      excess burst size information;
      network congestion information;
      queue length information relating to selected circuits within the network; and
      dropped packet information.

17. The computer program product of claim 16 wherein the portion of retrieved information which is analyzed includes committed information rate information.

18. The computer program product of claim 16, wherein the updated control information specifies a limit on the operation of at least one network element.

19. The computer program product of claim 18 wherein the portion of retrieved information which is analyzed includes committed information rate information.

20. The computer program product of claim 16 wherein the portion of retrieved information which is analyzed includes excess information rate information.

21. The computer program product of claim 20 wherein the computer program instructions stored within the at least one computer readable product are further configured to:
   receive an event notification message relating to an error reported by a specific network element; and
   suspend analysis of information related to said specific network element in response to reception of said error notification message.

22. The computer program product of claim 21 wherein the portion of retrieved information which is analyzed includes excess burst size information.

23. The computer program product of claim 22 wherein the portion of retrieved information which is analyzed includes dropped packet information.

24. The computer program product of claim 16 wherein the portion of retrieved information which is analyzed includes committed burst size information.

25. The computer program product of claim 16 wherein the portion of retrieved information which is analyzed includes excess burst size information.

26. The computer program product of claim 16 wherein the portion of retrieved information which is analyzed includes information relating to queue lengths at selected circuits within the network.

27. The computer program product of claim 16 wherein the portion of retrieved information which is analyzed includes dropped packet information.

28. The computer program product of claim 16 wherein the computer program instructions stored within the at least one computer readable product are further configured to automatically update control parameters of a second subset of network elements in response to said analysis of said portion of retrieved information to thereby affect performance of said network portion.

29. The computer program product of claim 16 wherein the computer program instructions stored within the at least one computer readable product are further configured to transmit said updated control information to a second data source.

30. The computer program product of claim 29 wherein said first data source and said second data source reside within a common device.

31. A policy engine for providing dynamic feedback control of network elements in a data network, the data network including a plurality of network elements, each of said network elements having a plurality operating parameters associated therewith, said operating parameters being related to at least one control parameter of said element, said policy engine comprising:
   at least one CPU;
   memory; and
   at least one interface for retrieving information related to a first subset of network elements from a first data source;
   said policy engine being operable to analyze at least a portion of said retrieved information based upon selected guidelines to determine whether a performance of at least a portion of said network conforms with predetermined criteria;
   said policy engine being further operable to automatically send updated control information to at least one network element based upon said analysis of said retrieved information when it is determined that a performance of the at least a portion of the network fails to conform with predetermined criteria;
   wherein the portion of retrieved information which is analyzed includes at least one type of information selected from a group comprising:
      committed information rate information;
      excess information rate information;
      committed burst size information;

excess burst size information;
network congestion information;
queue length information relating to selected circuits within the network; and
dropped packet information.

32. The policy engine of claim 31 wherein the portion of retrieved information which is analyzed includes committed information rate information.

33. The policy engine of claim 31 wherein the portion of retrieved information which is analyzed includes excess information rate information.

34. The policy engine of claim 31 wherein the portion of retrieved information which is analyzed includes committed burst size information.

35. The policy engine of claim 31 wherein the portion of retrieved information which is analyzed includes excess burst size information.

36. The policy engine of claim 31 wherein the portion of retrieved information which is analyzed includes information relating to queue lengths at selected circuits within the network.

37. The policy engine of claim 31 wherein the portion of retrieved information which is analyzed includes dropped packet information.

38. The policy engine of claim 31 wherein said policy engine includes a plurality of plug-in policies, each policy specifying a specific set of guidelines for analyzing said information.

39. The policy engine of claim 31 wherein the updated control information specifies a limit on the operation of at least one network element.

40. The policy engine of claim 31 wherein said policy engine is further operable to automatically update control parameters in a second subset of network elements in response to said analysis of said portion of retrieved information to thereby affect performance of said network portion.

41. The policy engine of claim 31 wherein said policy engine is further operable to transmit said updated control information to a second data source.

42. The policy engine of claim 41 wherein said first data source and said second data source reside within a common device.

43. The policy engine of claim 31 further including an event handling entity operable to receive event notification information relating to at least one network element.

44. The policy engine of claim 43 wherein said event handling entity is further operable to report errors detected by said policy engine to an event notification server.

* * * * *